(12) United States Patent
Chi et al.

(10) Patent No.: US 7,188,142 B2
(45) Date of Patent: Mar. 6, 2007

(54) DYNAMIC SUBJECT INFORMATION GENERATION IN MESSAGE SERVICES OF DISTRIBUTED OBJECT SYSTEMS IN A SEMICONDUCTOR ASSEMBLY LINE FACILITY

(75) Inventors: Yueh-shian T. Chi, San Jose, CA (US); Parris C. M. Hawkins, Pleasanton, CA (US); Charles Q. Huang, Union City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 714 days.

(21) Appl. No.: 09/725,908

(22) Filed: Nov. 30, 2000

(65) Prior Publication Data

US 2002/0103866 A1 Aug. 1, 2002

(51) Int. Cl.
*G06F 15/16* (2006.01)
(52) U.S. Cl. ...................... 709/206; 709/232
(58) Field of Classification Search ............... 709/206, 709/217, 221, 232; 707/10, 102; 700/121; 438/21; 719/318

See application file for complete search history.

(56) References Cited

U.S. PATENT DOCUMENTS

| | | |
|---|---|---|
| 3,205,485 A | 9/1965 | Noltingk |
| 3,229,198 A | 1/1966 | Libby |
| 3,767,900 A | 10/1973 | Chao et al. |
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,200,028 A * | 4/1993 | Tatsumi .................. 438/695 |
| 5,208,765 A | 5/1993 | Turnbull |
| 5,220,517 A | 6/1993 | Sierk et al. |

(Continued)

FOREIGN PATENT DOCUMENTS

CA 2050247 8/1991

(Continued)

OTHER PUBLICATIONS

Nathan Muller, Open View, 1995, CBM Books, p. 131.*

(Continued)

*Primary Examiner*—Le Hien Luu
*Assistant Examiner*—Stephan Willett
(74) *Attorney, Agent, or Firm*—Wilmer Cutler Pickering Hale & Dorr LLP

(57) ABSTRACT

A system, method and medium of sending messages in a distributed data processing network is described, and contemplates receiving a message that includes subject information that is generated based on one or more pre-selected portions as the message is generated. A message delivery system in a client-server environment is also described. The message delivery system includes a server configured to receive a message that includes subject information that is generated based on one or more pre-selected portions as the message is created and configured to forward the message based on the subject information.

14 Claims, 11 Drawing Sheets

U.S. PATENT DOCUMENTS

| | | |
|---|---|---|
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,706,452 A * | 1/1998 | Ivanov ............ 715/751 |
| 5,719,495 A | 2/1998 | Moslehi |
| 5,719,796 A | 2/1998 | Chen |
| 5,735,055 A | 4/1998 | Hochbein et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,835,922 A * | 11/1998 | Shima et al. ............ 715/522 |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,052,563 A * | 4/2000 | Macko ............ 340/7.1 |
| 6,054,379 A | 4/2000 | Yau et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |
| 6,113,462 A | 9/2000 | Yang |
| 6,114,238 A | 9/2000 | Liao |
| 6,127,263 A | 10/2000 | Parikh |
| 6,128,016 A | 10/2000 | Coelho et al. |

| Patent | Date | Inventor |
|---|---|---|
| 6,136,163 A | 10/2000 | Cheung et al. |
| 6,141,660 A | 10/2000 | Bach et al. |
| 6,143,646 A | 11/2000 | Wetzel |
| 6,148,099 A | 11/2000 | Lee et al. |
| 6,148,239 A | 11/2000 | Funk et al. |
| 6,148,246 A | 11/2000 | Kawazome |
| 6,150,270 A | 11/2000 | Matsuda et al. |
| 6,157,864 A | 12/2000 | Schwenke et al. |
| 6,159,075 A | 12/2000 | Zhang |
| 6,159,644 A | 12/2000 | Satoh et al. |
| 6,161,054 A | 12/2000 | Rosenthal et al. |
| 6,169,931 B1 | 1/2001 | Runnels |
| 6,172,756 B1 | 1/2001 | Chalmers et al. |
| 6,173,240 B1 | 1/2001 | Sepulveda et al. |
| 6,175,777 B1 | 1/2001 | Kim |
| 6,178,390 B1 | 1/2001 | Jun |
| 6,181,013 B1 | 1/2001 | Liu et al. |
| 6,183,345 B1 | 2/2001 | Kamono et al. |
| 6,185,324 B1 | 2/2001 | Ishihara et al. |
| 6,191,864 B1 | 2/2001 | Sandhu |
| 6,192,291 B1 | 2/2001 | Kwon |
| 6,197,604 B1 | 3/2001 | Miller et al. |
| 6,204,165 B1 | 3/2001 | Ghoshal |
| 6,210,983 B1 | 4/2001 | Atchison et al. |
| 6,211,094 B1 | 4/2001 | Jun et al. |
| 6,212,961 B1 | 4/2001 | Dvir |
| 6,214,734 B1 | 4/2001 | Bothra et al. |
| 6,217,412 B1 | 4/2001 | Campbell et al. |
| 6,219,711 B1 | 4/2001 | Chari |
| 6,222,936 B1 | 4/2001 | Phan et al. |
| 6,226,563 B1 | 5/2001 | Lim |
| 6,226,792 B1 | 5/2001 | Goiffon et al. |
| 6,228,280 B1 | 5/2001 | Li et al. |
| 6,230,069 B1 | 5/2001 | Campbell et al. |
| 6,236,903 B1 | 5/2001 | Kim et al. |
| 6,237,050 B1 | 5/2001 | Kim et al. |
| 6,240,330 B1 | 5/2001 | Kurtzberg et al. |
| 6,240,331 B1 | 5/2001 | Yun |
| 6,245,581 B1 | 6/2001 | Bonser et al. |
| 6,246,972 B1 | 6/2001 | Klimasauskas |
| 6,248,602 B1 | 6/2001 | Bode et al. |
| 6,249,712 B1 | 6/2001 | Boiquaye |
| 6,252,412 B1 | 6/2001 | Talbot et al. |
| 6,253,366 B1 | 6/2001 | Mutschler, III |
| 6,259,160 B1 | 7/2001 | Lopatin et al. |
| 6,263,255 B1 | 7/2001 | Tan et al. |
| 6,268,270 B1 | 7/2001 | Scheid et al. |
| 6,271,670 B1 | 8/2001 | Caffey |
| 6,276,989 B1 | 8/2001 | Campbell et al. |
| 6,277,014 B1 | 8/2001 | Chen et al. |
| 6,278,899 B1 | 8/2001 | Piche et al. |
| 6,280,289 B1 | 8/2001 | Wiswesser et al. |
| 6,281,127 B1 | 8/2001 | Shue |
| 6,284,622 B1 | 9/2001 | Campbell et al. |
| 6,287,879 B1 | 9/2001 | Gonzales et al. |
| 6,290,572 B1 | 9/2001 | Hofmann |
| 6,291,367 B1 | 9/2001 | Kelkar |
| 6,292,708 B1 | 9/2001 | Allen et al. |
| 6,298,274 B1 | 10/2001 | Inoue |
| 6,298,470 B1 | 10/2001 | Breiner et al. |
| 6,303,395 B1 | 10/2001 | Nulman |
| 6,304,999 B1 | 10/2001 | Toprac et al. |
| 6,307,628 B1 | 10/2001 | Lu et al. |
| 6,314,379 B1 | 11/2001 | Hu et al. |
| 6,317,643 B1 | 11/2001 | Dmochowski |
| 6,320,655 B1 | 11/2001 | Matsushita et al. |
| 6,324,481 B1 | 11/2001 | Atchison et al. |
| 6,334,807 B1 | 1/2002 | Lebel et al. |
| 6,336,841 B1 | 1/2002 | Chang |
| 6,339,727 B1 | 1/2002 | Ladd |
| 6,340,602 B1 | 1/2002 | Johnson et al. |
| 6,345,288 B1 | 2/2002 | Reed et al. |
| 6,345,315 B1 | 2/2002 | Mishra |
| 6,346,426 B1 | 2/2002 | Toprac et al. |
| 6,355,559 B1 | 3/2002 | Havemann et al. |
| 6,360,133 B1 | 3/2002 | Campbell et al. |
| 6,360,184 B1 | 3/2002 | Jacquez |
| 6,363,294 B1 | 3/2002 | Coronel et al. |
| 6,366,934 B1 | 4/2002 | Cheng et al. |
| 6,368,879 B1 | 4/2002 | Toprac |
| 6,368,883 B1 | 4/2002 | Bode et al. |
| 6,368,884 B1 | 4/2002 | Goodwin et al. |
| 6,379,980 B1 | 4/2002 | Toprac |
| 6,381,564 B1 | 4/2002 | David et al. |
| 6,388,253 B1 | 5/2002 | Su |
| 6,389,475 B1 * | 5/2002 | Speakman et al. .......... 709/232 |
| 6,389,491 B1 | 5/2002 | Jacobson et al. |
| 6,391,780 B1 | 5/2002 | Shih et al. |
| 6,395,152 B1 | 5/2002 | Wang |
| 6,397,114 B1 | 5/2002 | Eryurek et al. |
| 6,400,162 B1 | 6/2002 | Mallory et al. |
| 6,405,096 B1 | 6/2002 | Toprac et al. |
| 6,405,144 B1 | 6/2002 | Toprac et al. |
| 6,416,938 B1 * | 7/2002 | Kubacki ..................... 430/323 |
| 6,417,014 B1 | 7/2002 | Lam et al. |
| 6,427,093 B1 | 7/2002 | Toprac |
| 6,432,728 B1 | 8/2002 | Tai et al. |
| 6,435,952 B1 | 8/2002 | Boyd et al. |
| 6,438,438 B1 | 8/2002 | Takagi et al. |
| 6,440,295 B1 | 8/2002 | Wang |
| 6,442,496 B1 | 8/2002 | Pasadyn et al. |
| 6,449,524 B1 | 9/2002 | Miller et al. |
| 6,455,415 B1 | 9/2002 | Lopatin et al. |
| 6,455,937 B1 | 9/2002 | Cunningham |
| 6,465,263 B1 | 10/2002 | Coss, Jr. et al. |
| 6,466,956 B1 * | 10/2002 | Cho et al. ................... 715/531 |
| 6,470,230 B1 | 10/2002 | Toprac et al. |
| 6,479,902 B1 | 11/2002 | Lopatin et al. |
| 6,479,990 B2 | 11/2002 | Mednikov et al. |
| 6,482,660 B2 | 11/2002 | Conchieri et al. |
| 6,484,064 B1 | 11/2002 | Campbell |
| 6,486,492 B1 | 11/2002 | Su |
| 6,492,281 B1 | 12/2002 | Song et al. |
| 6,495,452 B1 | 12/2002 | Shih |
| 6,503,839 B2 | 1/2003 | Gonzales et al. |
| 6,515,368 B1 | 2/2003 | Lopatin et al. |
| 6,517,413 B1 | 2/2003 | Hu et al. |
| 6,517,414 B1 | 2/2003 | Tobin et al. |
| 6,528,409 B1 | 3/2003 | Lopatin et al. |
| 6,529,789 B1 | 3/2003 | Campbell et al. |
| 6,532,555 B1 | 3/2003 | Miller et al. |
| 6,535,783 B1 | 3/2003 | Miller et al. |
| 6,537,912 B1 | 3/2003 | Agarwal |
| 6,540,591 B1 | 4/2003 | Pasadyn et al. |
| 6,541,401 B1 | 4/2003 | Herner et al. |
| 6,546,508 B1 | 4/2003 | Sonderman et al. |
| 6,556,881 B1 | 4/2003 | Miller |
| 6,560,504 B1 | 5/2003 | Goodwin et al. |
| 6,563,308 B2 | 5/2003 | Nagano et al. |
| 6,567,717 B2 | 5/2003 | Krivokapic et al. |
| 6,580,958 B1 | 6/2003 | Takano |
| 6,587,744 B1 | 7/2003 | Stoddard et al. |
| 6,590,179 B2 | 7/2003 | Tanaka et al. |
| 6,604,012 B1 | 8/2003 | Cho et al. |
| 6,605,549 B2 | 8/2003 | Leu et al. |
| 6,606,652 B1 * | 8/2003 | Cohn et al. ................. 709/217 |
| 6,607,976 B2 | 8/2003 | Chen et al. |
| 6,609,946 B1 | 8/2003 | Tran |
| 6,616,513 B1 | 9/2003 | Osterheld |
| 6,618,692 B2 | 9/2003 | Takahashi et al. |
| 6,624,075 B1 | 9/2003 | Lopatin et al. |
| 6,625,497 B2 | 9/2003 | Fairbairn et al. |
| 6,630,741 B1 | 10/2003 | Lopatin et al. |
| 6,640,151 B1 | 10/2003 | Somekh et al. |
| 6,643,682 B1 * | 11/2003 | Todd et al. ................. 709/202 |
| 6,652,355 B2 | 11/2003 | Wiswesser et al. |

| | | | | | | |
|---|---|---|---|---|---|---|
| 6,660,633 | B1 | 12/2003 | Lopatin et al. | JP | HEI 1-283934 | 11/1989 |
| 6,678,570 | B1 | 1/2004 | Pasadyn et al. | JP | 3-202710 | 9/1991 |
| 6,708,074 | B1 | 3/2004 | Chi et al. | JP | 05-151231 | 6/1993 |
| 6,708,075 | B2 | 3/2004 | Sonderman et al. | JP | 05-216896 | 8/1993 |
| 6,721,748 | B1 * | 4/2004 | Knight et al. ............ 707/10 | JP | 05-266029 | 10/1993 |
| 6,725,402 | B1 | 4/2004 | Coss, Jr. et al. | JP | 06-110894 | 4/1994 |
| 6,728,587 | B2 | 4/2004 | Goldman et al. | JP | 06-176994 | 6/1994 |
| 6,735,492 | B2 | 5/2004 | Conrad et al. | JP | 6-184434 | 7/1994 |
| 6,735,623 | B1 * | 5/2004 | Prust ............ 709/219 | JP | 06-252236 | 9/1994 |
| 6,751,518 | B1 | 6/2004 | Sonderman et al. | JP | 06-260380 | 9/1994 |
| 6,772,196 | B1 * | 8/2004 | Kirsch et al. ............ 709/206 | JP | 8-23166 | 1/1996 |
| 6,774,998 | B1 | 8/2004 | Wright et al. | JP | 8-50161 | 2/1996 |
| 6,775,689 | B1 * | 8/2004 | Raghunandan ............ 709/206 | JP | HEI 8-149583 | 6/1996 |
| 2001/0001755 | A1 | 5/2001 | Sandhu et al. | JP | 8-304023 | 11/1996 |
| 2001/0003084 | A1 | 6/2001 | Finarov | JP | HEI 9-34535 | 2/1997 |
| 2001/0006873 | A1 | 7/2001 | Moore | JP | 9-246547 | 9/1997 |
| 2001/0030366 | A1 | 10/2001 | Nakano et al. | JP | 10-34522 | 2/1998 |
| 2001/0039462 | A1 | 11/2001 | Mendez et al. | JP | 10-173029 | 6/1998 |
| 2001/0040997 | A1 | 11/2001 | Tsap et al. | JP | HEI 11-67853 | 3/1999 |
| 2001/0042690 | A1 | 11/2001 | Talieh | JP | 11-126816 | 5/1999 |
| 2001/0044667 | A1 | 11/2001 | Nokano et al. | JP | 11-135601 | 5/1999 |
| 2001/0049721 | A1 * | 12/2001 | Blair et al. ............ 709/203 | JP | 2000-183001 | 6/2000 |
| 2002/0032499 | A1 | 3/2002 | Wilson et al. | JP | 2001-76982 | 3/2001 |
| 2002/0058460 | A1 | 5/2002 | Lee et al. | JP | 2001-284299 | 10/2001 |
| 2002/0070126 | A1 | 6/2002 | Sato et al. | JP | 2001-305108 | 10/2001 |
| 2002/0077031 | A1 | 6/2002 | Johansson et al. | JP | 2002-9030 | 1/2002 |
| 2002/0081951 | A1 | 6/2002 | Boyd et al. | JP | 2002-343754 | 11/2002 |
| 2002/0089676 | A1 | 7/2002 | Pecen et al. | TW | 434103 | 5/2001 |
| 2002/0102853 | A1 | 8/2002 | Li et al. | TW | 436383 | 5/2001 |
| 2002/0107599 | A1 | 8/2002 | Patel et al. | TW | 455938 | 9/2001 |
| 2002/0107604 | A1 | 8/2002 | Riley et al. | TW | 455976 | 9/2001 |
| 2002/0113039 | A1 | 8/2002 | Mok et al. | WO | WO 95/34866 | 12/1995 |
| 2002/0127950 | A1 | 9/2002 | Hirose et al. | WO | WO 98/05066 | 2/1998 |
| 2002/0128805 | A1 | 9/2002 | Goldman et al. | WO | WO 98/45090 | 10/1998 |
| 2002/0149359 | A1 | 10/2002 | Crouzen et al. | WO | WO 99/09371 | 2/1999 |
| 2002/0165636 | A1 | 11/2002 | Hasan | WO | WO 99/25520 | 5/1999 |
| 2002/0183986 | A1 | 12/2002 | Stewart et al. | WO | WO 99/59200 | 11/1999 |
| 2002/0185658 | A1 | 12/2002 | Inoue et al. | WO | WO 00/00874 | 1/2000 |
| 2002/0193899 | A1 | 12/2002 | Shanmugasundram et al. | WO | WO 00/05759 | 2/2000 |
| 2002/0193902 | A1 | 12/2002 | Shanmugasundram et al. | WO | WO 00/35063 | 6/2000 |
| 2002/0197745 | A1 | 12/2002 | Shanmugasundram et al | WO | WO 00/54325 | 9/2000 |
| 2002/0197934 | A1 | 12/2002 | Paik | WO | WO 00/79355 A1 | 12/2000 |
| 2002/0199082 | A1 | 12/2002 | Shanmugasundram et al. | WO | WO 01/11679 | 2/2001 |
| 2003/0017256 | A1 | 1/2003 | Shimane | WO | WO 01/15865 A1 | 3/2001 |
| 2003/0020909 | A1 | 1/2003 | Adams et al. | WO | WO 01/18623 | 3/2001 |
| 2003/0020928 | A1 | 1/2003 | Ritzdorf et al. | WO | WO 01/25865 | 4/2001 |
| 2003/0154062 | A1 | 8/2003 | Daft et al. | WO | WO 01/33277 | 5/2001 |
| | | | | WO | WO 01/33501 A1 | 5/2001 |
| | | | | WO | WO 01/52055 A3 | 7/2001 |

FOREIGN PATENT DOCUMENTS

| | | |
|---|---|---|
| CA | 2165847 | 8/1991 |
| CA | 2194855 | 8/1991 |
| EP | 0 397 924 A1 | 11/1990 |
| EP | 0 621 522 A2 | 10/1994 |
| EP | 0 747 795 A2 | 12/1996 |
| EP | 0 869 652 | 10/1998 |
| EP | 0877308 | 11/1998 |
| EP | 0 881 040 A2 | 12/1998 |
| EP | 0 895 145 A1 | 2/1999 |
| EP | 0 910 123 | 4/1999 |
| EP | 0 932 194 | 7/1999 |
| EP | 0 932 195 A1 | 7/1999 |
| EP | 1 066 925 A2 | 1/2001 |
| EP | 1 067 757 | 1/2001 |
| EP | 1 071 128 | 1/2001 |
| EP | 1 083 470 A2 | 3/2001 |
| EP | 1 092 505 A2 | 4/2001 |
| EP | 1072967 A3 | 11/2001 |
| EP | 1 182 526 A2 | 2/2002 |
| GB | 2 347 885 A | 9/2000 |
| GB | 2 365 215 A | 2/2002 |
| JP | 61-66104 | 4/1986 |
| JP | 61-171147 | 8/1986 |

| | | |
|---|---|---|
| WO | WO 01/52319 | 7/2001 |
| WO | WO 01/57823 A2 | 8/2001 |
| WO | WO 01/080306 | 10/2001 |
| WO | WO 02/17150 A1 | 2/2002 |
| WO | WO 02/31613 A2 | 4/2002 |
| WO | WO 02/31613 A3 | 4/2002 |
| WO | WO 02/33737 A2 | 4/2002 |
| WO | WO 02/074491 | 9/2002 |

OTHER PUBLICATIONS

Byte.com, Publish or Perish, Sep. 1997, p. 4.*

Microsoft, MS Message Queue Server, Jan. 1998, Microsoft, chapter 1, p. 19.*

IslamRaja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." *J. Vac. Sci. Technol. B*, vol. 11, No. 3, pp. 720-726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3-4, pp. 315-326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16-17, 1998. "A Real-Time Equipment Monitoring and Fault Detection System." *Semiconductor Manufacturing Technology Workshop*, pp. 111-121.

Lantz, Mikkel. 1999. "Equipment and APC Integration at AMD with Workstream." *IEEE*, pp. 325-327.

Jul. 15, 2004. Office Action for U.S. Appl. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Serial No. PCT/US02/19063.

Aug. 18, 2004. International Preliminary Examination Report for PCT Serial No. PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Serial No. PCT/US02/21942.

Sep. 16, 2004. International Preliminary Examination Report for PCT Serial No. PCT/US02/24859.

Sun, S.C. 1998. "CVD and PVD Transition Metal Nitrides as Diffusion Barriers for Cu Metallization." *IEEE*. pp. 243-246.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE*. pp. 635-638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). *Advanced Metallization Conference 2000*. San Diego, CA.

Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). *IEEE*. pp. 207-209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*. Montreal, Quebec.

Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report*. vol. 102, No. 178, pp. 115-118.

Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13-14, pp. 149-153.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603-606.

Van der Straten, O., Y. Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." *IEEE*. pp. 188-190.

Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." *IEEE*. pp. 595-598.

Jul. 25, 2003. International Search Report for PCT/US02/24858.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928,474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2002.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on* Munich, Germany Sep. 12-16, 1994. New York, New York: IEEE. pp. 105-112.

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Jun. 20, 2002. Office Action for U.S. Appl. No. 09/619,044, filed Jul. 19, 2000.

Sep. 26, 2002. Office Action for U.S. Appl. No. 09/637,620, filed Aug. 11, 2000.

Oct. 23, 2002. Office Action for U.S. Appl. No. 09/469,227, filed Dec. 22, 1999.

Dec. 17, 2002. Office Action for U.S. Appl. No. 09/363,966, filed Jul. 29, 1999.

Feb. 10, 2003. Office Action for U.S. Appl. No. 09/619,044, filed Jul. 19, 2000.

Apr. 9, 2003. Office Action for U.S. Appl. No. 09/928,474, filed Aug. 14, 2001.

May 8, 2003. Office Action for U.S. Appl. No. 09/637,620, filed Aug. 11, 2000.

Jun. 18, 2003. Office Action for U.S. Appl. No. 09/655,542, filed Sep. 6, 2000.

Aug. 8, 2003. International Search Report for PCT/US03/08513.

Aug. 25, 2003. Office Action for U.S. Appl. No. 10/100,184, filed Mar. 19, 2002.

Sep. 15, 2003. Office Action for U.S. Appl. No. 09/928,474, filed Aug. 14, 2001.

Nov. 5, 2003. Office Action for U.S. Appl. No. 10/172,977, filed Jun. 18, 2002.

Dec. 1, 2003. Office Action for U.S. Appl. No. 10/173,108, filed Jun. 18, 2002.

Dec. 11, 2003. Office Action for U.S. Appl. No. 09/943,383, filed Aug. 31, 2001.

Dec. 16, 2003. International Search Report for PCT/US03/23964.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Miller, G. L., D. A. H. Robinson, and J. D. Wiley. Jul. 1976. "Contactless measurement of semiconductor conductivity by radio frequency-free-carrier power absorption." *Rev. Sci. Instrum.*, vol. 47, No. 7. p. 799-805.

1999. "Contactless Bulk Resistivity/Sheet Resistance Measurement and Mapping Systems." www.Lehighton.com/fabtech1/index.html.

2000. "Microsense II Capacitance Gaging System." www.adetech.com.

El Chemali, Chadi et al. Jul./Aug. 2000. "Multizone uniformity control of a chemical mechanical polishing process utilizing a pre- and Postmeasurement strategy." *J. Vac. Sci. Technol.* vol. 18, No. 4. pp. 1287-1296.

Mar. 5, 2001. "KLA-Tencor Introduces First Production-worthy Copper CMP In-situ Film Thickness and End-point Control System." http://www.kla-tencor.com/j/servlet/NewsItem?newsItemID=74.

2002. "Microsense II—5810: Non-Contact Capacitance Gaging Module." www.adetech.com.

Aug. 8, 2003. PCT International Search Report from PCT/US03/08513.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

"NanoMapper wafer nanotopography measurement by ADE Phase Shift." http://www.phase-shift.com/nanomap.shtml.

"Wafer flatness measurement of advanced wafers." http://www.phase-shift.com/wafer-flatness.shtml.

"ADE Technologies, Inc.—6360." http://www.adetech.com/6360.shtml.

"3D optical profilometer MicroXAM by ADE Phase Shift." http://www.phase-shift.com/microxam.shtml.

"NanoMapper FA factory automation wafer nanotopography measurement." http://www.phase-shift.com/nanomapperfa.shtml.

Sep. 15, 2004. Office Action for U.S. Appl. No. 10/632,107, filed Aug. 1, 2003.

Sep. 29, 2004. Office Action for U.S. Appl. No. 09/363,966, filed Jul. 29, 1999.

Oct. 1, 2004. International Preliminary Examination Report for PCT Serial No. PCT/US03/23964.

Oct. 6, 2004. Office Action for U.S. Appl. No. 10/759,108, filed Jan. 20, 2004.

Oct. 12, 2004. International Preliminary Examination Report for PCT Serial No. PCT/US02/19061.

Nov. 17, 2004. Written Opinion for PCT Serial No. PCT/US01/27407.

Williams, Randy, Dadi Gudmundsson, Kevin Monahan, Raman Nurani, Meryl Stoller and J. George Shanthikumar. Oct. 1999. "Optimized Sample Panning for Wafer Defect Inspection," *Semiconductor Manufacturing Conference Proceedings, 1999 IEEE International Symposium on* Santa Clara, CA. Piscataway, NJ. pp. 43-46.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 20, 2003. Written Opinion for PCT/US01/22833.

Ostanin, Yu. Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45-52. Moscow, USSR.

Feb. 1984. "Substrate Screening Process." *IBM Technical Disclosure Bulletin*, pp. 4824-4825.

Herrmann, D. 1988. "Temperature Errors and Ways of Elimination for Contactless Measurement of Shaft Vibrations (Abstract)." *Technisches Messen™*, vol. 55, No. 1, pp. 27-30. West Germany.

Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216-229.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43-51.

Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.

Burke, Peter A. Jun. 1991. "Semi-Empirical Modelling of SiO2 Chemical-Mechanical Polishing Planarization." *VMIC Conference, 1991 IEEE*, pp. 379-384. IEEE.

May 1992. "Laser Ablation Endpoint Detector." *IBM Technical Disclosure Bulletin*, pp. 333-334.

Spanos, Costas J., Hai-Fang Guo, Alan Miller, and Joanne Levine-Parrill. Nov. 1992. "Real-Time Statistical Process Control Using Tool Data." *IEEE Transactions on Semiconductor Manufacturing*, v. 5, n. 4, pp. 308-318.

Feb. 1993. "Electroless Plating Scheme to Hermetically Seal Copper Features." *IBM Technical Disclosure Bulletin*, pp. 405-406.

Scarr, J. M. and J. K. Zelisse. Apr. 1993. "New Topology for Thickness Monitoring Eddy Current Sensors (Abstract)." *Proceedings of the 36th Annual Technical Conference*, Dallas, Texas.

Matsuyama, Akira and Jessi Niou. 1993. " A State-of-the-Art Automation System of an ASIC Wafer Fab in Japan." *IEEE/SEMi International Semiconductor Manufacturing Science Syposium*, pp. 42-47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438-442.

Kurtzberg, Jerome M. and Menachem Levanoni. Jan. 1994. "ABC: A Better Control for Manufacturing." *IBM Journal of Research and Development*, v. 38, n. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1-11.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun.-Jul. 1994. "Application of Feedforward and Adaptive Feedback Control to Semiconductor Device Manufacturing (Abstract)." *Proceedings of 1994 American Control Conference—ACC '94*, vol. 1, pp. 892-896. Baltimore, Maryland.

Schaper, C. D., M. M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C. J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3-17.

Leang, Sovarong, Shang-Yi Ma, John Thomson, Bart John Bombay, and Costas J. Spanos. May 1996. "A Control System for Photolithographic Sequences." *IEEE Transactions on Semiconductor Manufacturing*, vol. 9, No. 2.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on Components, Packaging, and Manufacturing Technology—Part C*, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshhop*, pp. 375-381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control*, vol. 2, pp. 1229-1233. Kobe, Japan.

Fan, Jr-Min, Ruey-Shan Guo, Shi-Chung Chang, and Kian-Huei Lee. 1996. "Abnormal Tred Detection of Sequence-Disordered Data Using EWMA Method." *IEEE/SEMI Advanced Semiconductor Manufacturing Conference*, pp. 169-174.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. " A Cost-Effective Methodology for a Run-by-Run EWMA Controller." 6th *International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997, "Pre-Production Results Demonstrating Multiple-System Models for Yield Analysis (Abstract)." *IEEE Transactions on Semiconductor Manufacturing*, vol. 10, No. 4, pp. 469-481.

Durham Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." $2^{nd}$ *International Workshop on Statistical Metrology*, pp. 90-93.

Jul. 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217-224.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76-78.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Boning, Duane S., Jerry Stefani, and Stephanie W. Butler. Feb. 1999. "Statistical Methods for Semiconductor Manufacturing." *Encyclopedia of Electrical Engineering*, J. G. Webster, Ed.

McIntosh, John. Mar. 1999. "Using CD-SEM Metrology in the Manufacture of Semiconductors (Abstract)." *JOM*, vol. 51, No. 3, pp. 38-39.

Pan, J. Tony, Ping Li, Kapila Wijekoon, Stan Tsai, and Fritz Redeker. May 1999. "Cooper CMP Integration and Time Dependent Pattern Effect." *IEEE 1999 International Interconnect Techology Conference*, pp. 164-166.

Meckl, P. H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725-729. Kohala Coast, HI.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." $24^{th}$ *IEEE/CPMT Electronics Manufacturing Technology Symposium*, pp. 258-263.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." *IEEE Transactions on Semiconductor Manufacturing*, vol. 12, No. 4.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the 38th IEEE Conference on Decision and Control*, Phoenix, Arizona, vol. 4, pp. 4185-4191.

Meckl, P. H. and K. Umemoto. Apr. 2000. "Achieving Fact Motions by Using Shaped Reference Inputs [Semiconductor Manufacturing Machine] (Abstract)." *NEC Research and Development*, vol. 41, No. 2, pp. 232-237.

Oechsner, R., T. Tschaftary, S. Sommer, L. Pfitzner, H. Ryssel, H. Gerath, C. Baier and M. Hafner. Sep. 2000. "Feed-forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, n. 11.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05 μm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." $51^{st}$ *Electronic Components and Technology Conference 2001. Proceedings*, pp. 1372-1379. Orlando, Florida.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Wang, LiRen and Hefin Rowlands. 2001. "A Novel NN-Fuzzy-SPC Feedback Control System." $8^{th}$ *IEEE International Conference on Emerging Technologies and Factory Automation*, pp. 417-423.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE Advanced Semiconductor Manufacturing Conference and Workshop*, pp. 125-130.

Sarfaty, M., A. Shanmugasundram, A. Schwarm, J. Paik, Jimin Zhang, Rong Pan, M. J. Seamons, H. Li, R. Hung, and S. Parikh. Apr.-May 2002. "Advance Process Control Solutions for Semiconductor Manufacturing (Abstract)." $13^{th}$ *Annual IEEE/SEMI Advanced Semiconductor Manufacturing Conference. Advancing the Science and Technology of Semiconductor Manufacturing. ASMC 2002*, pp. 101-106. Boston, MA.

Campbell, W. J., S. K. Firth, A. J. Toprac, and T. F. Edgar. May 2002. "A Comparison of Run-to-Run Control Algorithms (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285-287.

ACM Research, Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_releases/press_releases2001/984086002.html.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

Cunningham, James A. 2003. "Using Electrochemistry to Improve Copper Interconnects." <http://www.e-insite.net/semiconductor/index.asp?layout=article&articleid=CA47465>.

Mar. 25, 2003. International Search Report for PCT/US02/24859 prepared by the European Patent Office.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12$^{th}$ Edition. Applied Materials, Inc., Santa Clara, CA.

Berman, Mike, Thomas Bibby, and Alan Smith. "Review of In Situ & In-line Detection for CMP Applications." *Semiconductor Fabtech*, 8$^{th}$ Edition, pp. 267-274.

"Semiconductor Manufacturing: An Overview." <http://users.ece.gatech.edu/~gmay/overview.html>.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Hu, Albert, He Du, Steve Wong, Peter Renteln, and Emanuel Sachs. 1994. "Application of Run by Run Controller to the Chemical-Mechanical Planarization Process." IEEE/CPMT International Electronics Manufacturing Technology Symposium. pp. 371-378.

Smith, Taber, Duane Boning, James Moyne, Arnon Hurwitz, and John Curry. Jun. 1996. "Compensating for CMP Pad Wear Using Run by Run Feedback Control." Proceedings of the Thirteenth International VLSI Multilevel Interconnection Conference. pp. 437-439.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1-10.

Klein, Bruce. Jun. 1999. "Application Development: XML Makes Object Models More Useful." Informationweek. pp. 1A-6A.

Chemali, Chadi El, James Moyne, Kareemullah Khan, Rock Nadeau, Paul Smith, John Colt, Jonathan Chapple-Sokol, and Tarun Parikh. Jul./Aug. 2000. "Multizone Uniformity Control of a Chemical Mechanical Polishing Process Utilizing a Pre- and Postmeasurement Strategy." J. Vac. Sci. Technol. A, vol. 18(4). pp. 1287-1296. American Vacuum Society.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr./May 2002. "Advance Process Control Solutions for Semiconductor Manufacturing." IEEE/SEMI Advanced Semiconductor Manufacturing Conference. pp. 101-106.

Oct. 4, 2002. International Search Report from PCT/US01/22833.
Oct. 23, 2002. International Search Report from PCT/US01/27406.
Nov. 7, 2002. International Search Report from PCT/US02/19061.
Nov. 11, 2002. International Search Report from PCT/US02/19117.
Nov. 12, 2002. International Search Report from PCT/US02/19063.
Jul. 23, 2002. Communication Pursuant to Article 96(2) EPC for European Patent Application No. 00 115 577.9.
Oct. 15, 2002, International Search Report prepared by the European Patent Office for PCT/US02/19062.

Feb. 1984. "Method and Apparatus of in Situ Measurement and Overlay Error Analysis for Correcting Step and Repeat Lithographic Cameras." *IBM Technical Disclosure Bulletin*, pp. 4855-4859.

Oct. 1984. "Method to Characterize the Stability of a Step and Repeat Lithographic System." *IBM Technical Disclosure Bulletin*, pp. 2857-2860.

Schmid, Hans Albrecht. 1995. "Creating the Architecture of a Manufacturing Framework by Design Patterns." Austin, Texas: OOPSLA.

Baliga, John. Jul. 1999. "Advanced Process Control: Soon to be a Must." Cahners Semiconductor International. www.semiconductor.net/semiconductor/issues/issues/1999/jul99/docs/feature1.asp.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Oct. 15, 2001. Search Report prepared by the Austrian Patent Office for Singapore Patent Application No. 200004286-1.

Johnson, Bob. Jun. 10, 2002. "Advanced Process Control Key to Moore's Law." Gartner, Inc.

Jul. 9, 2002. International Search Report prepared by the European Patent Office for PCT/US01/24910.

Jul. 29, 2002. International Search Report prepared by the European Patent Office for PCT/US01/27407.

Sonderman, Thomas. 2002. "APC as a Competitive Manufacturing Technology: *AMD's Vision for 300mm*." AEC/APC.

Zhou, Zhen-Hong and Rafael Reif. Aug. 1995. "Epi-Film Thickness Measurements Using Emission Fourier Transform Infrared Spectroscopy—Part II: Real-Time *in Situ* Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42$^{nd}$ National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Smith, Taber, Duane Boning, James Moyne, Arnon Hurwitz, and John Curry. Jun. 1996. "Compensating for CMP Pad Wear Using Run by Run Feedback Control." Santa Clara, California: VLSI Multilevel Interconnect Conference.

Boning, Duane, William Moyne, Taber Smith, James Moyne, Roland Telfeyan, Arnon Hurwitz, Scott Shellman, and John Taylor. Oct. 1996. " Run by Run Control of Chemical-Mechanical Polishing." *IEEE Trans. CPMT (C)*, vol. 19, No. 4, pp. 307-314.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567-1603, 2000.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Moyne, James. Oct. 1999. "Advancements in CMP Process Automation and Control." Hawaii: (Invited paper and presentation to) Third International Symposium on Chemical Mechanical Polishing in IC Device Manufacturing: 196$^{th}$ Meeting of the Electrochemical Society.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

NovaScan 2020. Feb. 2002. "Superior Integrated Process Control for Emerging CMP High-End Applications."

Dishon, G., D. Eylon, M. Finarov, and A. Shulman. "Dielectric CMP Advanced Process Control Based on Integrated Monitoring." Ltd. Rehoveth, Israel: Nova Measuring Instruments.

Runyan, W. R., and K. E. Bean. 1990. "Semiconductor Integrated Circuit Processing Technology." p. 48. Reading, Massachusetts: Addison-Wesley Publishing Company.

Zorich, Robert. 1991. *Handbook of Quality Integrated Circuit Manufacturing.* pp. 464-498 San Diego, California: Academic Press, Inc.

Rampalli, Prasad, Arakere Ramesh, and Nimish Shah. 1991. CEPT—A Computer-Aided Manufacturing Application for Managing Equipment Reliability and Availability in the Semiconductor Industry. New York, New York: IEEE.

Moyne, James R., Nauman Chaudhry, and Roland Telfeyan. 1995. "Adaptive Extensions to a Multi-Branch Run-to-Run Controller for Plasma Etching." *Journal of Vacuum Science and Technology.* Ann Arbor, Michigan: University of Michigan Display Technology Manufacturing Center.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced Semiconductor Manufacturing Conference and Workshop.* Ann Arbor, Michigan: The University of Michigan, Electrical Engineering & Computer Science Center for Display Technology & Manufacturing.

U.S. Appl. No. 09/363,966, filed Jul. 29, 1999, Arackaparambil et al., Computer Integrated Manufacturing Techniques.

U.S. Appl. No. 09/469,227, filed Dec. 22, 1999, Somekh et al., Multi-Tool Control System, Method and Medium.

U.S. Appl. No. 09/619,044, filed Jul. 19, 2000, Yuan, System and Method of Exporting or Importing Object Data in a Manufacturing Execution System.

U.S. Appl. No. 09/637,620, filed Aug. 11, 2000, Chi et al., Generic Interface Builder.

U.S. Appl. No. 09/656,031, filed Sep. 6, 2000, Chi et al., Dispatching Component for Associating Manufacturing Facility Service Requestors with Service Providers.

Dishon, G., M. Finarov, R. Kipper, J.W. Curry, T. Schraub, D. Trojan, 4th Stambaugh, Y. Li and J. Ben-Jacob. Feb. 1996. "On-Line Integrated Metrology for CMP Processing." Santa Clara, California: VMIC Speciality Conferences, 1st International CMP Planarization Conference.

SEMI. [1986] 1996. "Standard for Definition and Measurement of Equipment Reliability, Availability, and Maintainability (RAM)." SEMI E10-96.

Van Zant, Peter. 1997. *Microchip Fabrication: A Practical Guide to Semiconductor Processing.* Third Edition, pp. 472-478. New York, New York: McGraw-Hill.

Campbell, W. Jarrett, and Anthony J. Toprac. Feb. 11-12, 1998. "Run-to-Run Control in Microelectronics Manufacturing." Advanced Micro Devises, TWMCC.

Consilium. Aug. 1998. *Quality Management Component: QMC™ and QMC-Link™ Overview.* Mountain View, California: Consilium, Inc.

Consilium. 1998. *FAB300™*, Mountain View, California: Consilium, Inc.

Khan, Kareemullah, Victor Solakhain, Anthony Ricci, Tier Gu, and James Moyne. 1998. "Run-to-Run Control of ITO Deposition Process." Ann Arbor, Michigan.

Moyne, James and John Curry. Jun. 1998. "A Fully Automated Chemical-Mechanical Planarization Process."

U.S. Appl. No. 09/655,542, filed Sep. 6, 2000, Yuan, System, Method and Medium for Defining Palettes to Transform an Application Program Interface for a Service.

SEMI. Jul. 1998. *New Standard: Provisional Specification for CIM Framework Domain Architecture.* Mountain View, California: SEMI Standards. SEMI Draft Doc. 2817.

Consilium. Jul. 1999. "Increasing Overall Equipment Effectiveness (OEE) in Fab Manufacturing by Implementing Consilium's Next-Generation Manufacturing Execution System —MES II." Semiconductor Fabtech Edition 10.

Consilium Corporate Brochure. Oct. 1999. www.consilium.com.

Consilium. Jan. 1999. "FAB300™ : Consilium's Next Generation MES Solution of Software and Services which Control and Automate Real-Time FAB Operations." www.consilium.com/products/fab300_page.htm#FAB300 Introduction.

Consilium. Nov. 1999. *FAB300™ Update.*

SEMI. 2000. "Provisional Specification for CIM Framework Scheduling Component." San Jose, California. SEMI E105-1000.

Levine, Martin D. 1985. *Vision in Man and Machine.* New York: McGraw-Hill, Inc. pp. ix-xii, 1-58.

Pilu, Maurizio. Sep. 2001. "Undoing Page Curl Distortion Using Applicable Surfaces." *IEEE International Conference on Image Processing.* Thessalonica, Greece.

May 23, 2003. Written Opinion for PCT/US01/24910.

US 6,150,664, 11/2000, Su (withdrawn)

* cited by examiner

DYNAMIC SUBJECT INFORMATION GENERATION IN MESSAGE SERVICES OF DISTRIBUTED OBJECT SYSTEMS IN A SEMICONDUCTOR ASSEMBLY LINE FACILITY

FIELD OF THE INVENTION

The present invention relates to message services in a distributed object system in which one or more message service servers interact with a number of publishers and subscribers. More specifically, the present invention relates to a system, method and medium for providing one or more message servers which communicate with one or more publishers configured to create and publish messages having changeable or selectable subject information, the published subject information being of potential interest to one or more of the subscribers.

BACKGROUND OF THE INVENTION

Distributed object systems are designed to increase the efficiency of computer program development by enabling object reuse and simplifying system maintenance through clear separation of functions. Each object in a distributed object system encapsulates the data for that object and the procedures or methods for operating on that data. Encapsulation means that the data for an object can be manipulated only by that object using the defined methods. These features of distributed object systems allow the objects to be reused and portable. Exemplary distributed object systems include: COM (Common Object Model), COM+, DCOM (Distributed Component Object Model) and CORBA (Common Object Request Broker Architecture).

One of the features of the distributed object system is a message service. A conventional message service system includes one or more publishers, subscribers and message servers. A publisher is a program (object or method) that makes calls that initiate sending messages that contain data, and a subscriber is another program (object or method) that receives the messages from a publisher. A subscriber indicates to (e.g., registers with) its message server that it wishes to receive messages from a publisher.

An exemplary conventional message service server is Message Queuing Services (MSMQ) developed by Microsoft may be used. MSMQ implements asynchronous message service by enabling applications (e.g., data providers) to send messages to other applications (e.g., data receivers). While the messages are being forwarded from senders to receivers, MSMQ keeps the messages in queues. The MSMQ queues may protect messages from being lost in transit and provide a place for receivers to look for messages when they are ready. MSMQ is configured to support IPX (Internet Packet exchange) and TCP/IP (Transmission Control Protocol/Internet Protocol) networking protocols. In the distributed object system parlance, a publisher is a data provider (e.g., the method sending the message) and a subscriber is a data receiver (e.g., the method receiving the message).

The conventional distributed systems fall short when messages are to be exchanged between a large number of publishers and subscribers, because in such a case the conventional message service system is required to pre-define the relation between the data providers and data receivers (e.g., certain types of messages are predefined to be received by certain subscribers). In particular, the conventional system may provide adequate message services when all the relations are predefined and do not change. However, the conventional message system fails when the relations are to be dynamic. For example, assume a subset of the data providers are to send messages to one subset of the data receivers under one condition while the same subset of the data providers are required to send messages to another subset of the data receivers under another condition. Under such a scenario, the connections between data providers and data receivers are required to be updated dynamically (e.g., as the conditions change and/or as the messages are created).

SUMMARY OF THE INVENTION

Accordingly, embodiments of the present invention provides an improved system, method and medium of sending messages in a distributed object system. More specifically, embodiments of the present invention contemplate receiving a message that includes subject information that is generated based on one or more pre-selected portions as the message is generated. The message is then delivered based on the subject information. Embodiments of the present invention also contemplates a message delivery system in a client-server environment. The message delivery system may include a server configured to receive a message that includes subject information that is generated based on one or more pre-selected portions as the message is created and configured to forward the message based on the subject information.

BRIEF DESCRIPTION OF THE DRAWINGS

The detailed description of a preferred embodiment of the present invention showing various distinctive features over prior art message servers may be best understood when the detailed description is read in reference to the appended drawing in which.

DETAILED DESCRIPTION OF THE INVENTION

Figure 1:
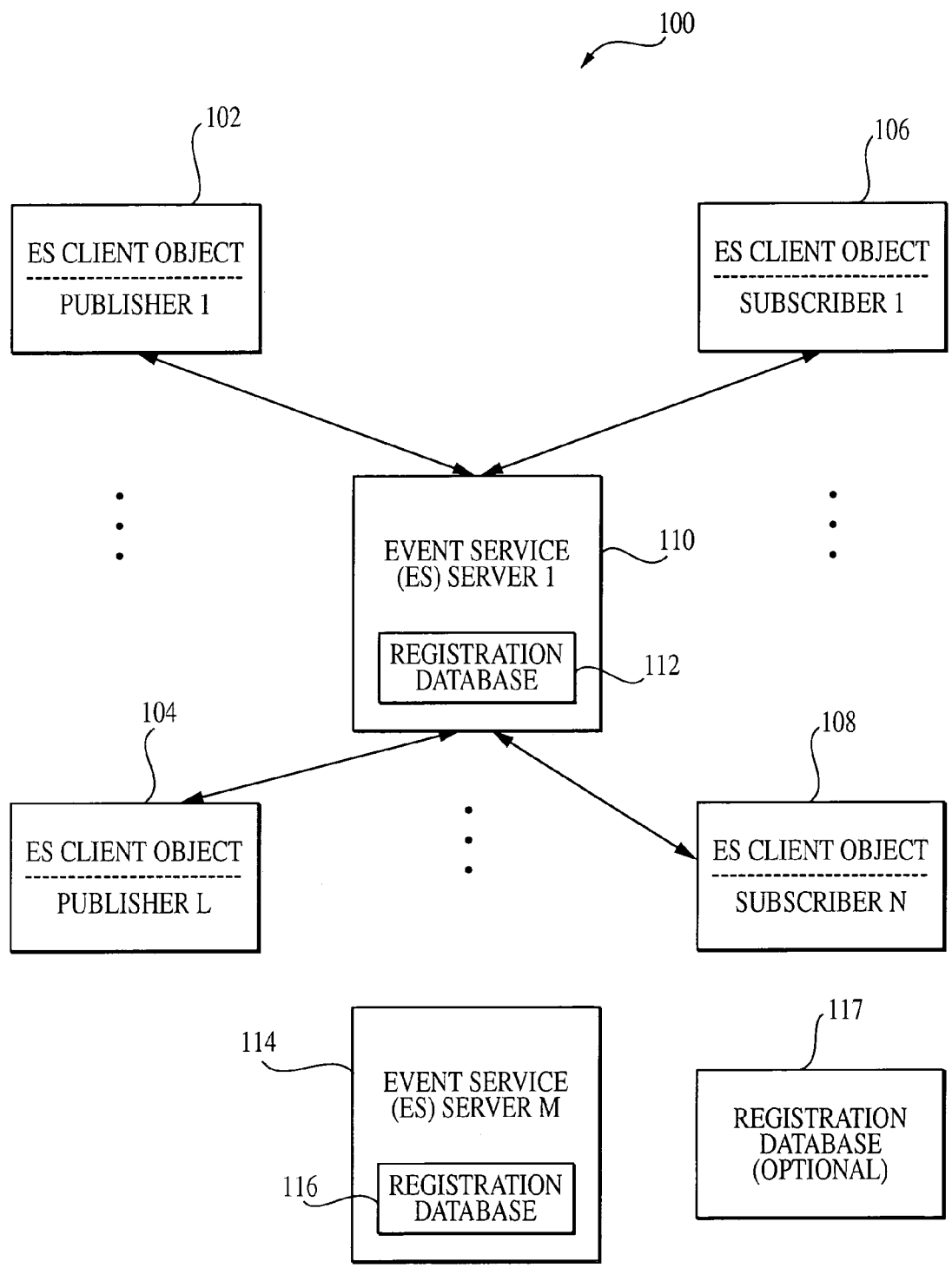
FIG. 1 is a schematic representation of an exemplary distributed object system of the present invention.

In FIG. 1, for purposes of explanation and not limitation, embodiments of the present invention are described in a client-server environment of a distributed object system. (Other environments, such as peer-to-peer, are also contemplated.) Referring now to FIG. 1, the exemplary client-server message service system 100 of the present invention includes a number of publishers 102, 104, subscribers 106, 108, and ES (Event Service) servers 110, 114. ES servers keep track of which subscribers desire to receive messages with certain subjects and direct the messages to those subscribers without requiring the subscribers to designate specific publishers. A registration may involve storing information relating to the registered subscribers (e.g., subject information about which the subscribers desire to receive messages and/or IP addresses of the subscribers to forward the messages). The letter "L" for publisher 104, "M" for ES server 114 and "N" for subscriber 108 represent different integer numbers to illustrate that embodiments of the present invention can include arbitrary numbers of publishers, ES servers and subscribers. It should be noted that publishers, subscribers and ES servers may be referring to objects and/or methods (i.e., the methods of those objects) depending upon the context in which they are referenced. In the parlance of the distributed object system, an object is a piece of code that owns features such as attributes and data, and provides services through methods (methods are also referred as operations or functions). In embodiments of the present invention, it is contemplated that the objects are coded using the C++ language, although it should be understood that other computer programming languages could also be used. In addition, it is also contemplated that objects can be implemented to be operational in COM (Common Object Model), COM+, DCOM (Distributed Component Object Model), CORBA (Common Object Request Broker Architecture) or other similar systems.

Publishers 102, 104, subscribers 106, 108 and ES servers 110, 114 typically reside in one or more computers. For example, the publishers may reside within a first group of computers, while the subscribers may reside within a second group of computers. Further, the ES servers may reside in a third group of computers. In an alternative embodiment, one or more publishers and subscribers may reside in one computer. In general, it should be understood that embodiments of the present invention envision that any number of computers may be utilized to include any combination of the publishers, subscribers and ES servers. The communication link among the publishers, subscribers and ES servers may include local area networks (LAN), wide area networks (WAN), the Internet (TCP/IP protocol), cable, optical, wireless or the like (or any combination thereof).

Each of messages to be serviced by the present invention preferably includes subject information (subject) and content information (content). The subject of a message characterizes and/or identifies it. The content is the substantive information of the message. In the parlance of the distributed object systems, the publishing of messages may be viewed as events.

Figure 2:
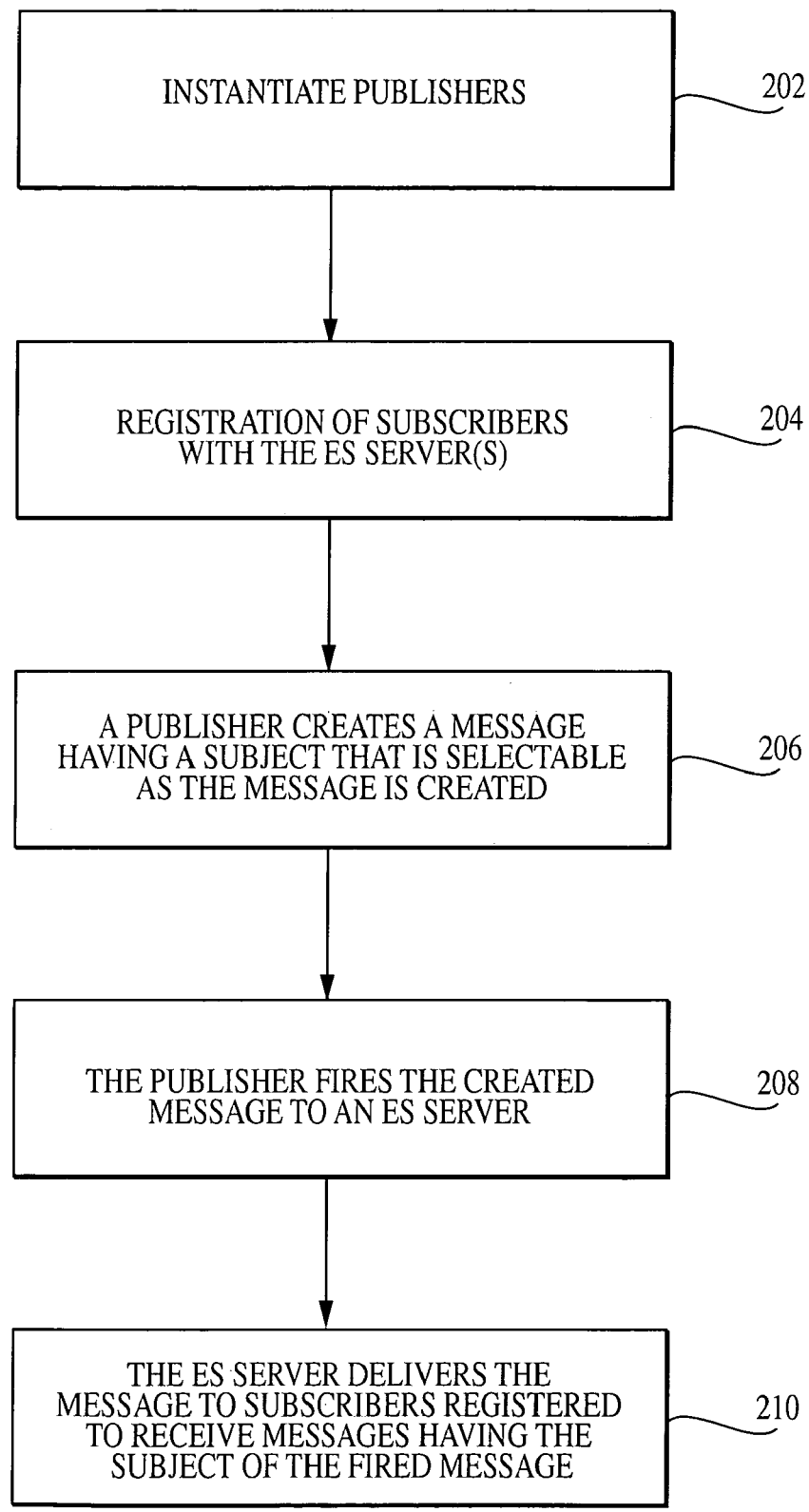
FIG. 2 is a flow chart representation of exemplary interactions among servers, publishers, and subscribers of the present invention.

A method of operation envisioned by embodiments of the present invention is described in conjunction with the flow chart of FIG. 2. Referring now to FIG. 2, embodiments of the present invention contemplate instantiating one or more publishers configured to forward messages to an ES server (step 202). And one or more subscribers register with one or more ES servers (step 204). In particular, for a subscriber to receive messages having a certain "subject", it is envisioned that the subscriber registers with one of ES servers.

When a subscriber is registered with an ES server, the ES server makes an entry into a registration database (e.g., a registration database 112 of FIG. 1 associated with ES server 110). The registration database is configured to store all or some pertinent information relating to the registered subscriber. For instance, the registration database may store information relating to a subject or subjects that the registered subscriber would like to receive from a publisher or publishers. The registration database may also store the destination addresses of the registered subscriber so that messages having the desired subject(s) may be transmitted thereto. Subscribers and publishers may add, delete and/or modify the registrations at any time by notifying the ES servers. The notified ES servers then update their corresponding registration databases.

In embodiments of the present invention, an ES server is allowed to be instantiated many times. In addition, each ES server notifies its registered subscribers to other instantiated ES servers. This feature allows a direct routing of published messages.

For instance, assume Publisher 1 is configured to fire (e.g., send) its messages to ES Server 1 and Subscriber N is registered with ES Server M. In embodiments of the present invention, ES Server M notifies ES Server 1 that Subscriber N is registered to receive messages having certain subject information. Accordingly, when a message having subject information identical to the subject information registered by Subscribe N is published by Publisher 1, the message is delivered directly from ES Server 1 to Subscriber N. The efficiency is gained by preventing the message being routed from ES Server 1 to ES Server M before it can be delivered to Subscriber N.

It follows that embodiments of the present invention may be configured to increase the capacity of its messaging services (e.g., be linearly scalable). In other words, when more messaging services are required, more ES servers are instantiated to handle the increased capacity. In embodiments of the present invention, there is no bottle neck that prevents the ES server to be linearly scalable.

A registration database may be stored and maintained in a memory bank at a remote location (117 of FIG. 1). In an alternative embodiment, the registration database may be stored in the memory of a computer in which the ES server resides. The content of such a registration database may be copied into one or more other ES servers. Accordingly, one or more ES servers may function as backups when the ES server that created the database is damaged or otherwise temporarily inoperable.

Figure 3:
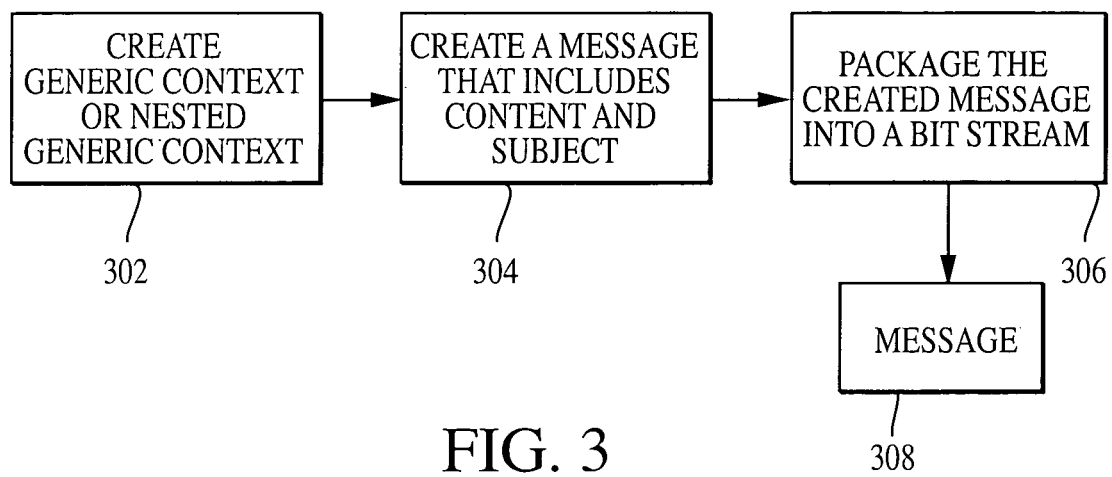
FIG. 3 is a flow chart representation of an exemplary packing step performed by a publisher of the present invention.

The next step as contemplated by embodiments of the present invention is for a publisher to create a message (e.g., an event) having a subject that is selectable as the message is generated (step 206). Step 206 is described in greater detail by referring to FIG. 3. Referring now to FIG. 3, in order to create a message, a publisher preferably creates GC (Generic Context) or a nested GC (step 302), creates subject and content of the message based on the GC (step 304), and packs the created message (step 306). A GC or a nested GC is a data structure with which the subject and content of messages are created, as described below.

First, in step 302, GC may include one or more context elements (e.g., possible subject elements). In an example contemplated herein, each context element may include a name, type, value and size thereof. Each context element could be of type integer, float, string, or a generic context (e.g., nested generic context), or an array of integers, an array float, an array of string, or an array of generic context. Table 1 below illustrates an exemplary nested GC. More specifically, the exemplary GC includes elements such as "LotNo," "Weight," "Loc," and "LotId" while it also includes arrays of GC elements designated as "GC1" and "GC2." Although not shown in Table 1, the size is also defined for each element.

TABLE 1

| Element NO | Variable Name | Type | Value |
|---|---|---|---|
| 1 | LotNo | Int | 125 |
| 2 | Weight | Float | 125.000 |
| 3 | GC1 | CGC_Context | Context1 |
| 4 | Loc | BSTR | "MtnView" |
| 5 | LotId | Int | 125 |
| 6 | GC2 | CGC_Context | Context2 |

The above described GC or nested GC forms exemplary content of a message to be created. In addition, embodiments of the present invention contemplate that for a message to be created, its "subject" is also generated. The subject can include two portions: a design time subject and a run-time subject. The design time subject (e.g., a fixed portion) is a portion of the subject that is specific to the publisher that created the message. Thus, each of the publishers has associated with it a design time subject, which becomes a part of the overall subject of a message generated by a publisher. In addition, as each message is created by a publisher, a run-time subject (e.g., a changeable portion) is appended to the design time subject of the publisher. Unlike the design time subject, the run-time subject is selectable by a user (e.g., an operator or automated entity). The subject, as it includes both the design time subject portion and the run-time subject portion, describes the format or the information relating to content (e.g., the values of each element).

Figure 5:
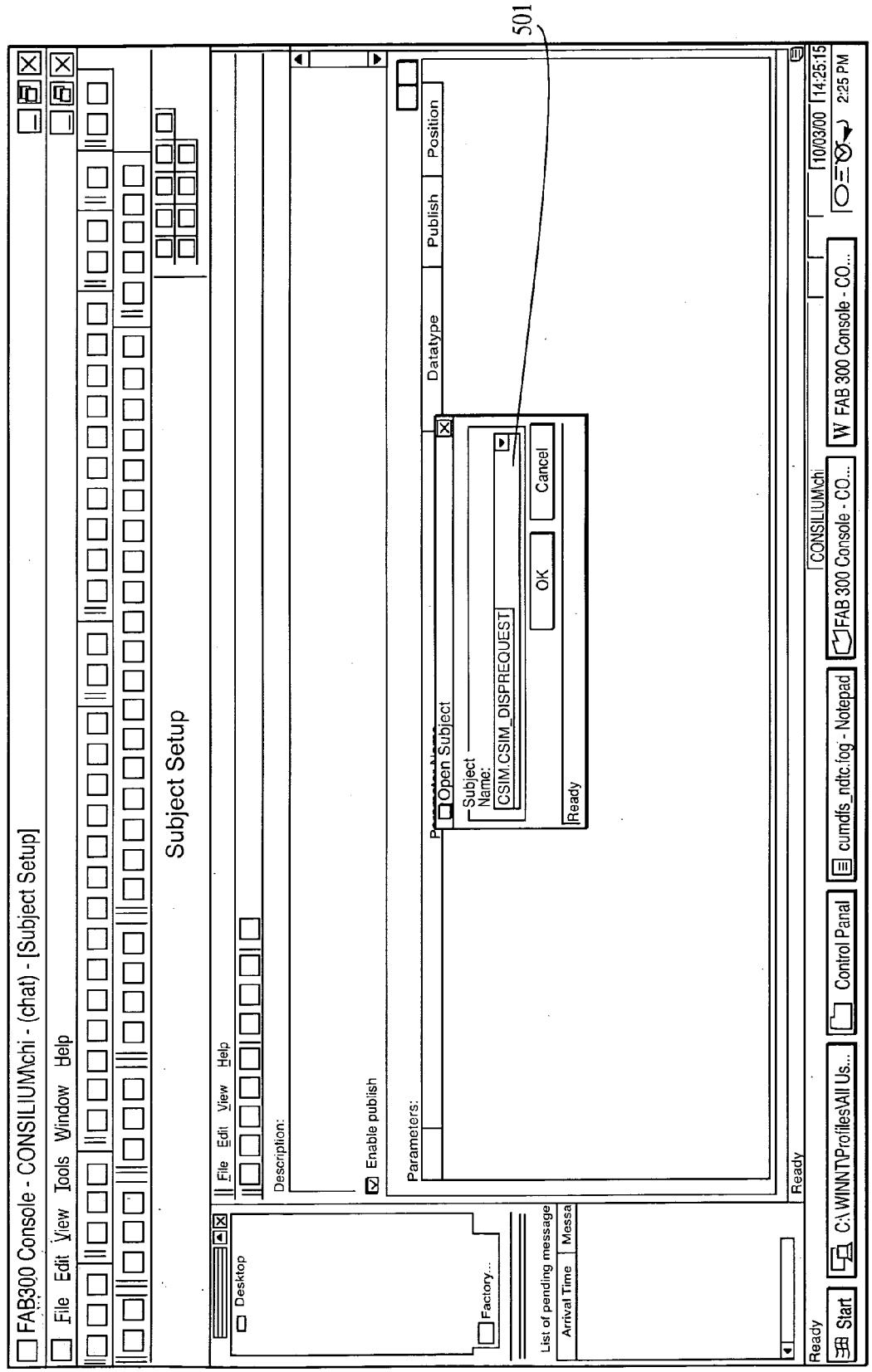
FIG. 5 is a drawing depicting an exemplary graphical user interface configured to show design time subject information of a message created by embodiments contemplated by the present invention.

As an example of the design time subject, FIG. 5 illustrates a graphical user interface which shows the design time subject of a publisher. More specifically, messages created by the illustrated publisher would always include "CSIM.C-SIM_DISPREQUEST" 501 as their design time subject. It should be noted that the design time subject "CSIM.CSIM_DISPREQUEST" is only provided here as an example. Any sequence of characters uniquely identifiable is sufficient to meet the purpose of the present invention.

Figure 6:
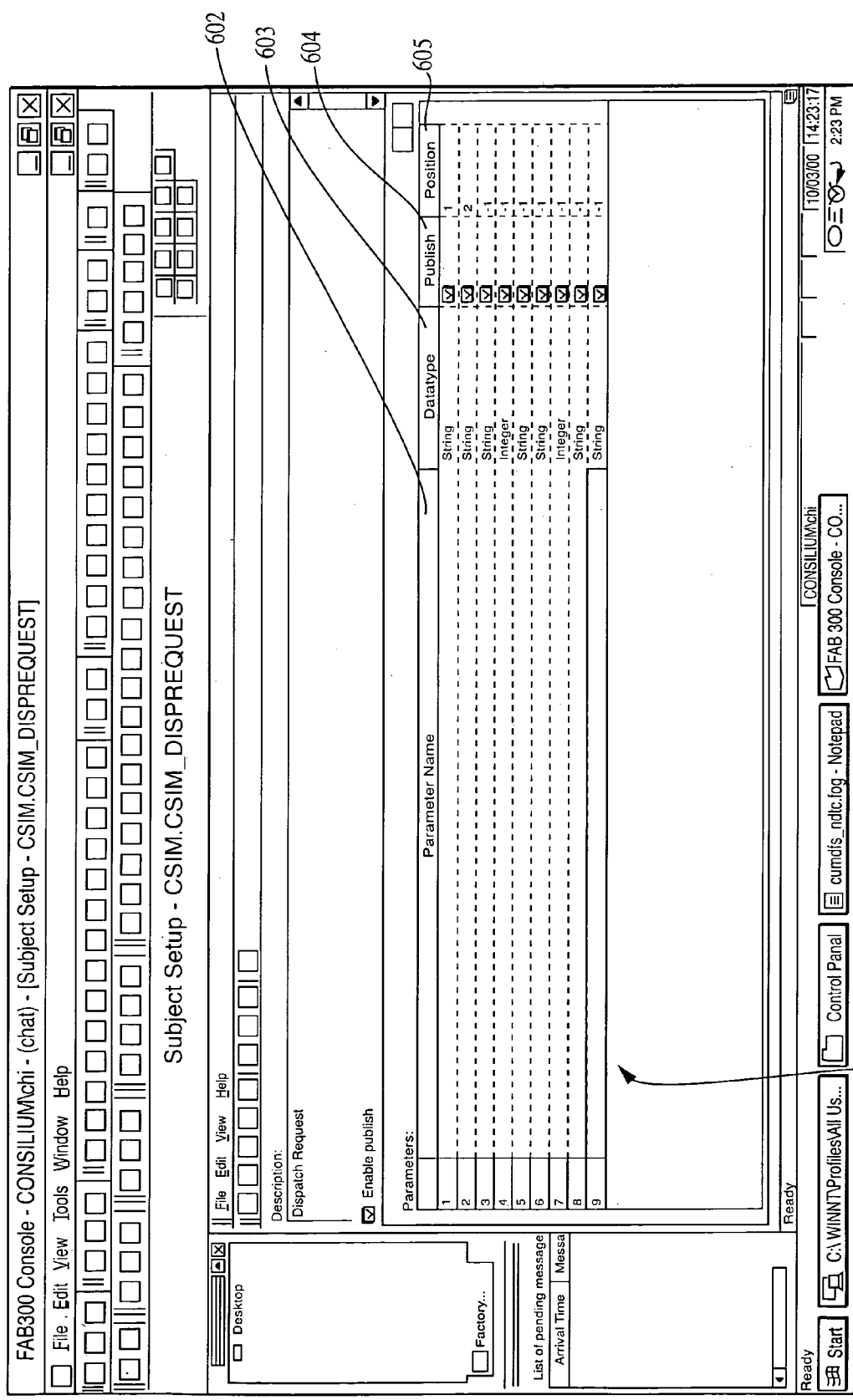
FIG. 6 is a drawing depicting an exemplary graphical user interface configured to show run-time subject information of a message created by embodiments contemplated by the present invention.

As an example of the run-time subject, FIG. 6 illustrates a graphical user interface which shows a list of all possible subject elements 601 that can be appended to the design time subject. As illustrated, each element includes name 602, data type 603, publish options 604, and position options 605. Accordingly, a user by using the graphical user interface depicted in FIG. 6 (or an automated mechanism by use of the graphical user interface or other facilities) may designate any combination of the elements to be published or not published as run-time subjects by making appropriate selections using the publish options 604, thereby producing configuration information of the run-time subject. The user is also allowed to include any combination of the elements to be part of the run-time subject or not by making appropriate selections using the position options 605. In the example selections illustrated in FIG. 6, the element "bstrDSNameSpace" element is selected to be published at position 1 of the run-time subject, and the element "bstrDSName" is selected to be published at position 2 of the run-time subject. The user may enter strings to represent the above identified exemplary elements (e.g., a string "Assembly_line_1" for the "bstrDSNameSpace" element and a string "Etcher_1" for the "bstrDSName" element). Accordingly, when the fixed and selected information in the examples illustrated in FIGS. 5 and 6 are combined, the following subject information may be created:

CSIM.CSIM_DISPREQUEST.Assembly_line_ 1.Etcher_1

A user may also select the position of the "bstrDSNameSpace" element to be 2 and the position of the "bstrDSName" element to be 1. In this example, the subject information may be:

CSIM.CSIM_DISPREQUEST.Etcher_1.Assembly_line_1.

The above described feature of selecting run-time subject is preferably performed by a meta-data server which may be a part of an ES server. In particular, the meta-data server allows a user to select any combination of all available run-time subject elements and also allows the user to arrange the selected elements in any order using the position options. Once the user selects and arranges the run-time subject for a particular publisher, that information is stored in the meta-data server. Subsequently, when the publisher is creating a message, based on its design time subject, the publisher retrieves the user selection and arrangement information from the meta-data server. The publisher then creates the message with subject information, the run-time subject of which is generated according to the retrieved information. Embodiments of the present invention contemplate that the user selection and arrangement information can be retrieved from the meta-data server and stored in the publisher's cache memory. In this scenario, unless the information in the cache memory is lost, it is envisioned that the meta-data server is not accessed again to retrieve the user selection and arrangement information.

Although not shown in FIG. 6, in this example the value of each element is also produced when the messages are created. The values represent data of each element (i.e., at least part of the content of the message). Accordingly, the GC context is used to form both the content format (e.g., information) and subject of the messages to be created.

Referring back to FIG. 3, a message that includes content and subject as described above is created as the result of step 304. The created message is then packaged into a stream of bits (step 306). In the parlance of the distributed object system, this step is called marshalling the message. One message at a time may be created, or one or more messages may be created simultaneously or in a sequence. The created messages are then fired (e.g., sent) to the ES server which is configured to route the messages for the publisher (step 208 of FIG. 2).

Referring back to FIG. 2, upon receiving the messages from the publisher, the ES server then searches its corresponding registration database to identify any registered subscribers that have registered to receive messages having the subject of the messages from the publisher. If there are any, the messages are then forwarded to those identified subscribers (step 210 of FIG. 2).

Referring back to FIG. 1, and as an example of the previously-described concepts, assume Subscriber 1 registers with ES Server 1 to receive messages having the subject of "Design_Time_Subject_1.run_time_subject_N." In this scenario, ES Server 1 also notifies one or more ES servers (e.g., ES Server M) to update their corresponding registration databases regarding subscriber 1. Subsequently, if Publisher L fires a message to ES Server M having a subject of "Design_Time_Subject_1.run_time_subject_N," then the message is preferably delivered to Subscriber 1 directly from ES Server M.

Embodiments of the present invention contemplate that a guarantee message delivery (GMD) mechanism can be provided. GMD can be used when hardware (e.g., computers) and network connections may be unstable.

In operation of the GMD feature, the ES servers keep messages for the subscriber when the subscriber is off-line. At the same time, a system-wide timeout period is set for each message. If a timeout happens before the subscriber retrieves its message, the message is preferably re-routed to an ES server where a predefined action may be taken. For instance, if a subscriber designated to receive a message is off-line for longer than a predetermined period (e.g., 5 minutes, a day, etc.), the ES server preferably sends a notice (e.g., a pager, an e-mail message, etc.) to an operator to take appropriate action.

Figure 4:
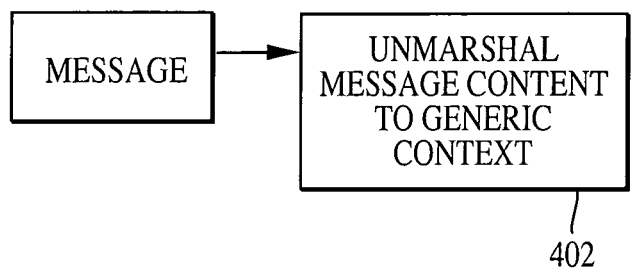
FIG. 4 is a flow chart representation of an exemplary unpacking step performed by a subscriber of the present invention.

Referring to FIG. 4, upon receiving a message, a subscriber unpacks the message which is in a binary stream format (step 402). In the parlance of the distributed object system, this step is referred as unmarshaling. When the message is unpacked, it is converted into the GC context format which was described above and exemplified in Table 1.

The messaging service of the present invention is described below in a pair of practical exemplary applications. Although only two applications are illustrated below, other applications in which messaging service utilizing publisher/subscriber configuration (e.g., a weather monitoring system, medical monitoring system or the like) are also contemplated within this invention and may be obvious variations of the present the exemplary applications described below.

Figure 7:
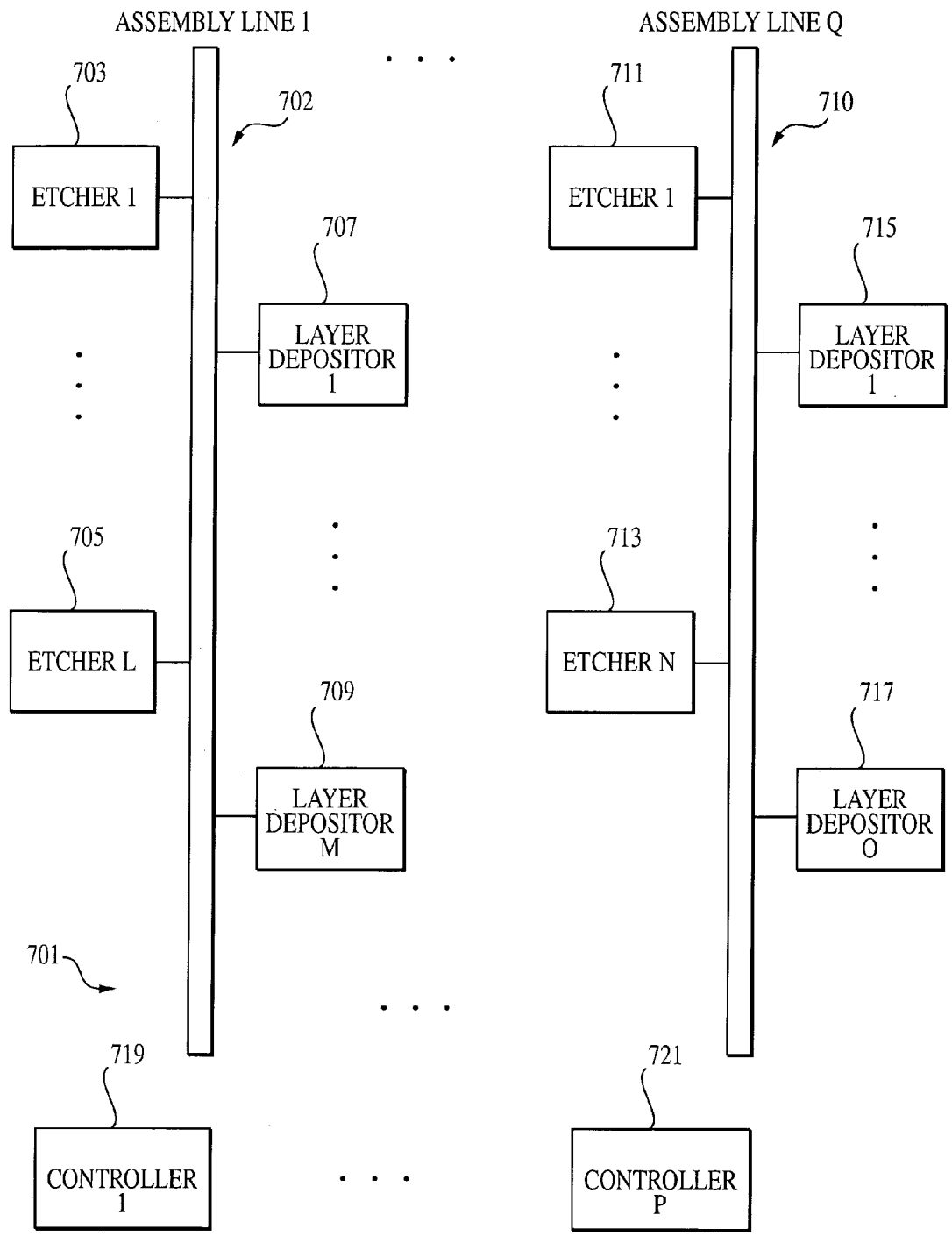
FIG. 7 is a block diagram of exemplary assembly lines implemented to use the message server of the present invention.
Figure 8:
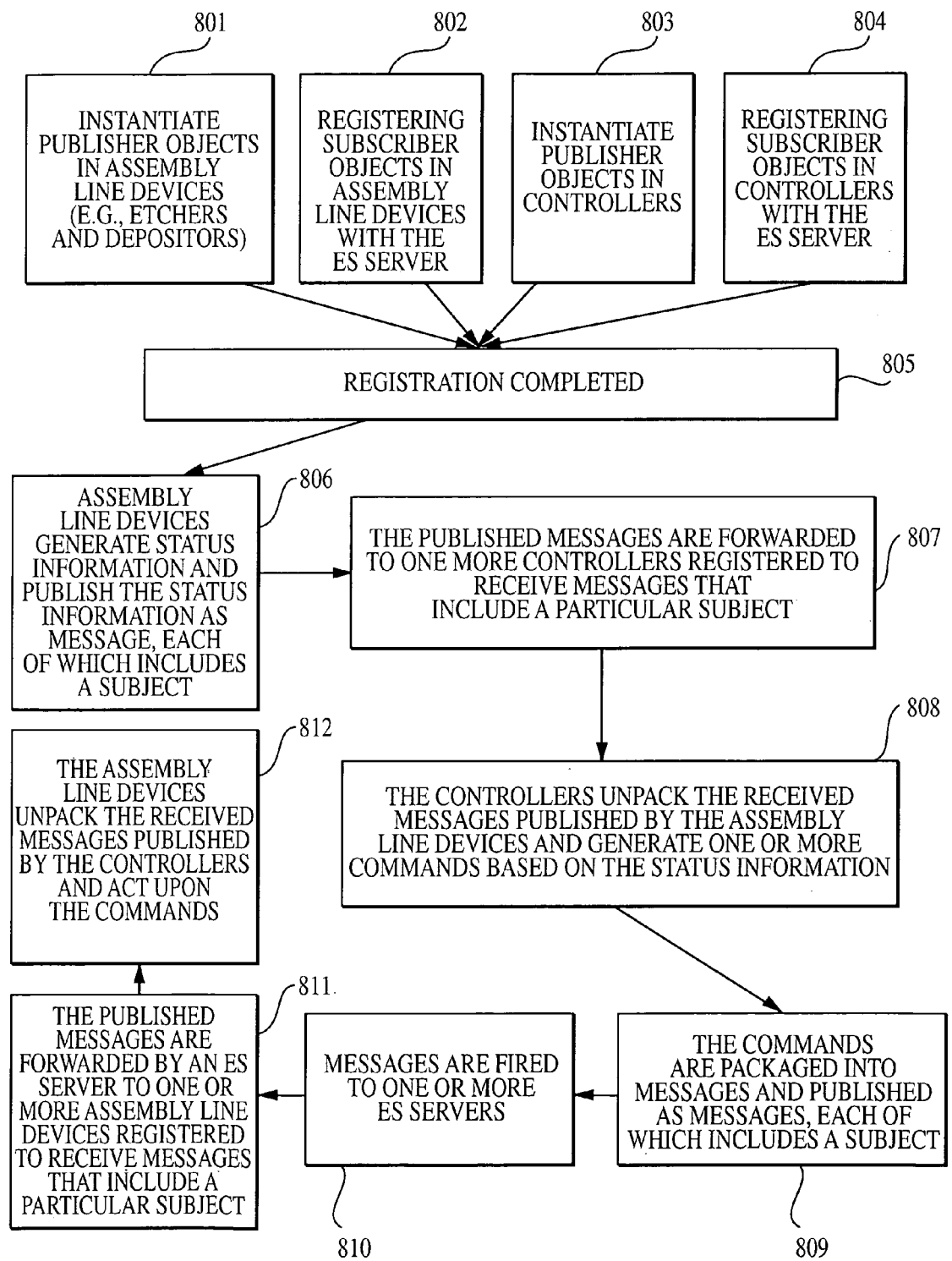
FIG. 8 is a flow chart representation of exemplary use of the message server of the present invention in the assembly lines depicted in FIG. 7.

The first exemplary illustration is described in conjunction with FIGS. 7 and 8. Referring first to FIG. 7, a microelectronic manufacturing system 701 configured to use in embodiments of the present invention includes a number of assembly lines 702, 710. Each assembly line includes manufacturing devices such as a number of etchers 703, 705, 711, 713 and layer depositors 707, 709, 715, 717. The manufacturing system also includes one or more controllers 719, 721. The letter "L" for etcher 705 in assembly line 1, "M" for layer depositor 709 in assembly line 1, "N" for etcher 713 in assembly line Q, "O" for layer depositors 717 in assembly line Q, "P" for controller 721 and "Q" for assembly line 710 represent different integer numbers to illustrate that embodiments of the present invention anticipate the utilization of any number of the designated items.

For instance, an etcher is a manufacturing apparatus configured to etch a layer or layers of a substrate during manufacture of an electronic device. Similarly a layer depositor is an apparatus configured to deposit a layer or layers on a substrate during manufacture of an electronic device. Preferably, assembly line devices (e.g., etchers, depositors) and controllers include a computer or computer-like device that includes a processor, a read-only memory device and a random access memory. Each of the assembly line devices and controller are also preferably configured to include at least one subscriber and one publisher operating in their respective computer or computer-like devices. In an alternative embodiment, one or more assembly line devices may include only a subscriber or a publisher operating in their respective computer or computer-like devices. In another alternative embodiment, one or more assembly line device may include no subscriber or publisher operating in their respective computer or computer-like devices. In yet another embodiment, one or more assembly line device may not include any computer or computer like devices.

One or more ES servers can reside in one or more server computers (not shown in FIG. 7). In an alternative embodiment, some or all of the ES servers may reside in any of the assembly line devices and/or controllers. The communication links among the assembly line devices, controllers and server computers, may include a local area network (LAN), wide area network (WAN), the Internet (TCP/IP protocol), cable, optical, wireless or the like (or any combination of them).

Embodiments of the present invention contemplate that, the manufacturing system depicted in FIG. 7 may be located in one facility. In an alternative embodiment, one of the assembly lines may be located in one facility while another one of the assembly lines may be located in a remotely located facility. In addition, the controllers may be located in one facility separated from the facility(ies) in which the assembly lines are located.

Now referring to FIG. 8, publishers are preferably instantiated and reside in one or more controllers and in the assembly line devices (steps 81, 83). Subscribers, which may reside in one or more controllers and in the assembly line devices, can also be registered with the one or more ES servers (steps 802, 804). Once the registration is completed (step 805), the message service may be activated. It should be noted, however, that embodiments of the present invention contemplate that subscribers and publishers may add, delete and/or modify the registrations at any time.

Subsequently, one or more subscribers located among the assembly line devices may create one or more messages (step 806). Such messages may include content information relating to, for example, the operating temperature of the devices, status of processes (e.g., etching or deposition) and/or maintenance information. Depending upon the character of the content information, the run-time subject is generated, which is appended to corresponding design time subjects.

TABLE 2

| Serial # | Metadataname | Data type | pub_flag | sub_pos |
|---|---|---|---|---|
| 1. | EntityNamespace | Text | 1 | 1 |
| 2. | EntityID | Text | 1 | 2 |
| ... | ... | ... | ... | ... |
| 5. | Quantity | Integer | 0 | −1 |

Table 2 above illustrates a detailed example of information relating to generating a run-time subject. In particular, the exemplary run-time subject may include five possible elements: "EntityNamespace," "EntityID" . . . "Quantity." Each element is defined by its name (i.e., metadata name), data type, and a publish flag and subject position definition. In this example, assume that the "EntityNamespace" element is defined as "Assembly line Q," and the EntityID element is defined as "Etcher_1." The "pub_flag" specifies whether particular element is to be published as part of the run-time subject: "1" designates that the element is to be published, "0" designates that the element is not to be published, and "−1" designates that the element is not to be included as a part of the runtime subject. If the element is to be published, then the "sub_pos" element specifies where the element is to be placed in the run-time subject. Assuming the design time subject is a string "Design_Time_Subject_1," then the subject specified in the above example may appear as the following:

Design Time_Subject_1.Assembly_Line$_{13}$ Q.Etcher_1

A user, by means of a graphical user interface similar to the one depicted in FIG. 6, is allowed to specify which of the elements are to be published and, if to be published, the location in which the elements are to be placed in the run-time subject. When messages are created with the appropriate content and subject, the messages are fired to the one or more ES servers configured to receive the messages.

Upon receiving the messages, the one or more ES servers refer to their corresponding registration databases to identify which one or more of registered subscribers registered interest in receiving messages having subjects that include the subjects of the received messages. The messages are forward to the identified subscribers (step 807).

In continuing with the above example described in connection with Table 2, assume two subscribers registered to receive messages having the following subjects:

First subscriber: Design_Time_Subject.Assembly_Line_Q (option field)
Second subscriber: Design_Time_Subject.Assembly_Line_Q.Etcher_1 (option field)

Depending upon a selection made in the option field, messages are delivered to various registered subscribers. The option field is configured to provide flexibility in matching subject information registered by the registered subscribers and the subject information provided by the published messages.

Examples of the use of the option field as contemplated by embodiments of the present invention will now be described. First, for the sake of this example, assume that the existence of a given uniquely identifiable character (e.g., ">"), means that any message that includes the subject elements previous to the character or any other elements appended thereto would be delivered to a subscriber registered with such an option. Thus, for example, assume further that the registered subject of the first subscriber is as follows:

Design_Time_Subject.Assembly_Line_Q.>

In this example, any message that includes "Design_Time_Subject.Assembly_Line_Q" or any other elements appended thereto (e.g., Design_Time_Subject.Assmbly_Line_Q.Etcher_1, Design_Time_Subject.Assembly_Line_Q.Etcher_2.Quantiy_1, etc.) as its subject would be delivered to the first subscriber.

It also follows that if the second subscriber has registered its subject as "Design_Time_Subject.Assembly_Line_Q.Etcher_1.>", then any message that includes "Design_Time_Subject.Assembly_Line_Q.Etcher_1" or any other elements appended thereto as their subject would be delivered to the second subscriber.

In another example, assume that the existence of another uniquely identifiable character ("*"), means that any message that includes the subject elements previous to the character or one element appended thereto would be delivered to a subscriber registered with such an option. Thus, for example, assume further that the registered subject of the first subscriber is as follows:

Design_Time_Subject.Assembly_Line_Q.*

In this example, any message that includes "Design_Time_Subject.Assembly_Line_Q" or one other element appended thereto (e.g., Design_Time_Subject.Assembly_Line_Q.Etcher_1, Design_Time_Subject.Assembly_Line_Q.Etcher_2, etc.) as its subject would be delivered to the first subscriber. The second subscriber functions similarly.

The above relationship between subjects of a message to be delivered and the subscribers is also applicable without regard to the number of elements specified. It should be noted that the above provided examples of option field characters (e.g., "*" and ">") are provided only as sample examples. Other conventions available in the art are contemplated by embodiments of the present invention.

In this example, it is envisioned that, the subscribers residing in the controllers register with the ES servers to receive messages from the publishers residing in the assembly line devices. Alternatively and/or in addition, one or more subscribers located in one or more assembly line devices may register to receive messages published by one or more publishers residing in other assembly line devices. In any event, and referring back to FIG. 8, when the messages are received by the subscribers, they are unpacked, and the contents of the unpacked messages are then retrieved and processed by the controllers (or assembly line devices) (step 808).

For instance, assume a controller is configured to monitor temperatures of one or more etchers to prevent them from overheating, then such a controller may receive messages that include temperature information created by the one or more etchers. When a message received from one of the etchers indicate an overheating condition, the controller may decide to send a message (e.g., create a command, as indicated by step 808) to the etcher or to every manufacturing device on that assembly line to shut down.

After determining that one or more messages are desired to be forwarded to one or more assembly line devices, (which, in this example, are envisioned to contain certain commands) messages with corresponding contents and subjects are created (step 809). The created messages are then fired (step 810) to the ES servers which forwards messages to appropriate subscribers based on corresponding registration databases (step 811). When the message is delivered to one or more subscribers (and/or controllers) they are unpacked (step 812). The unpacked message (and any commands therein) is processed to take further action, if any.

Continuing with the above example of an overheated etcher, when the etcher receives the message which contains a command to shut down, the etcher preferably shuts itself down. If messages are sent to each of the assembly line devices in that assembly line, then the whole assembly line may shut itself down.

It should be noted that sending and receiving messages among different assembly line devices and controllers are not required to occur in the sequence describe above. More specifically, one or more of the assembly line devices may be receiving messages from one or more controllers while one or more of the assembly line devices may be creating and firing a message to one or more controllers. In addition, one or more assembly line devices and controllers may be receiving, creating and firing messages simultaneously—a multithreaded processing feature of embodiments of the present invention.

Figure 9:
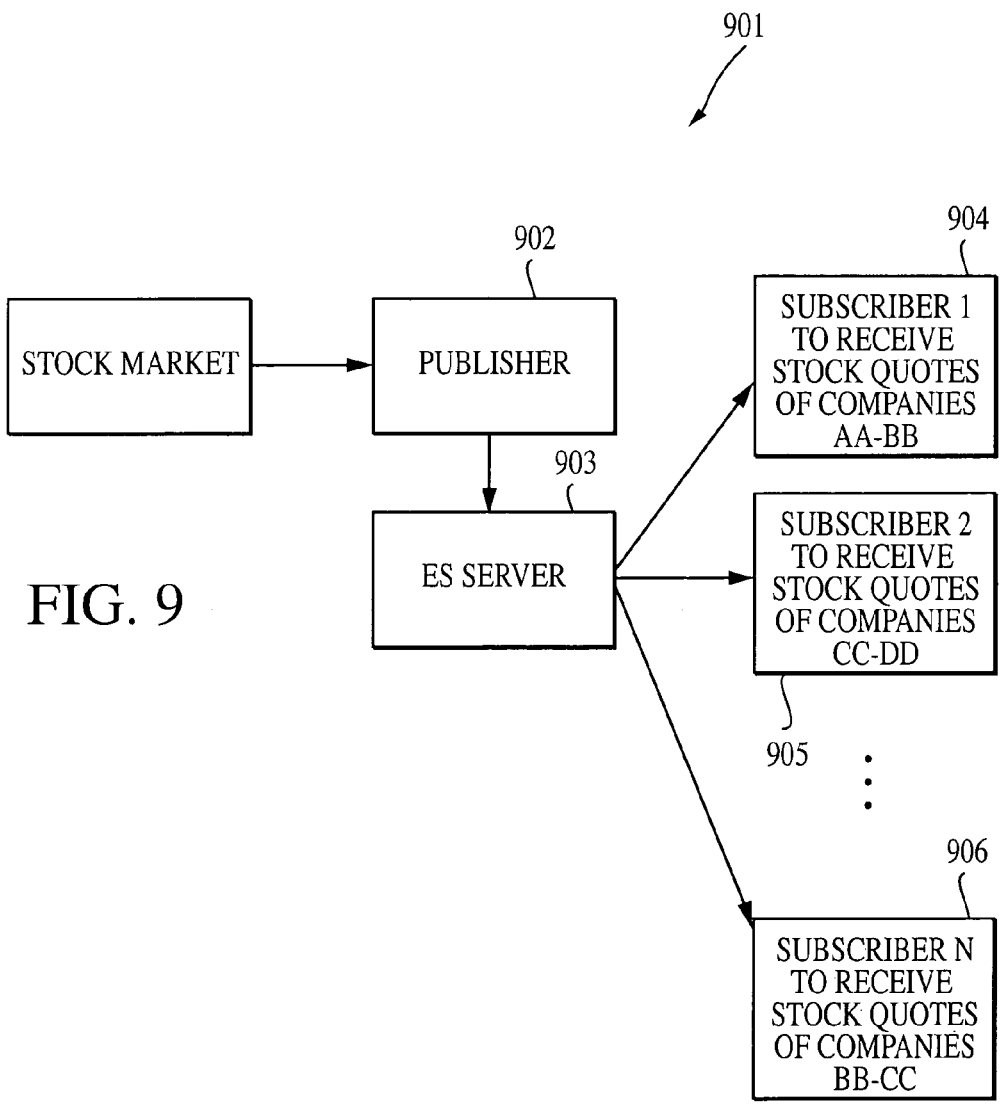
FIG. 9 is a block diagram of an exemplary stock quote system implemented to use the message server of the present invention.
Figure 10:
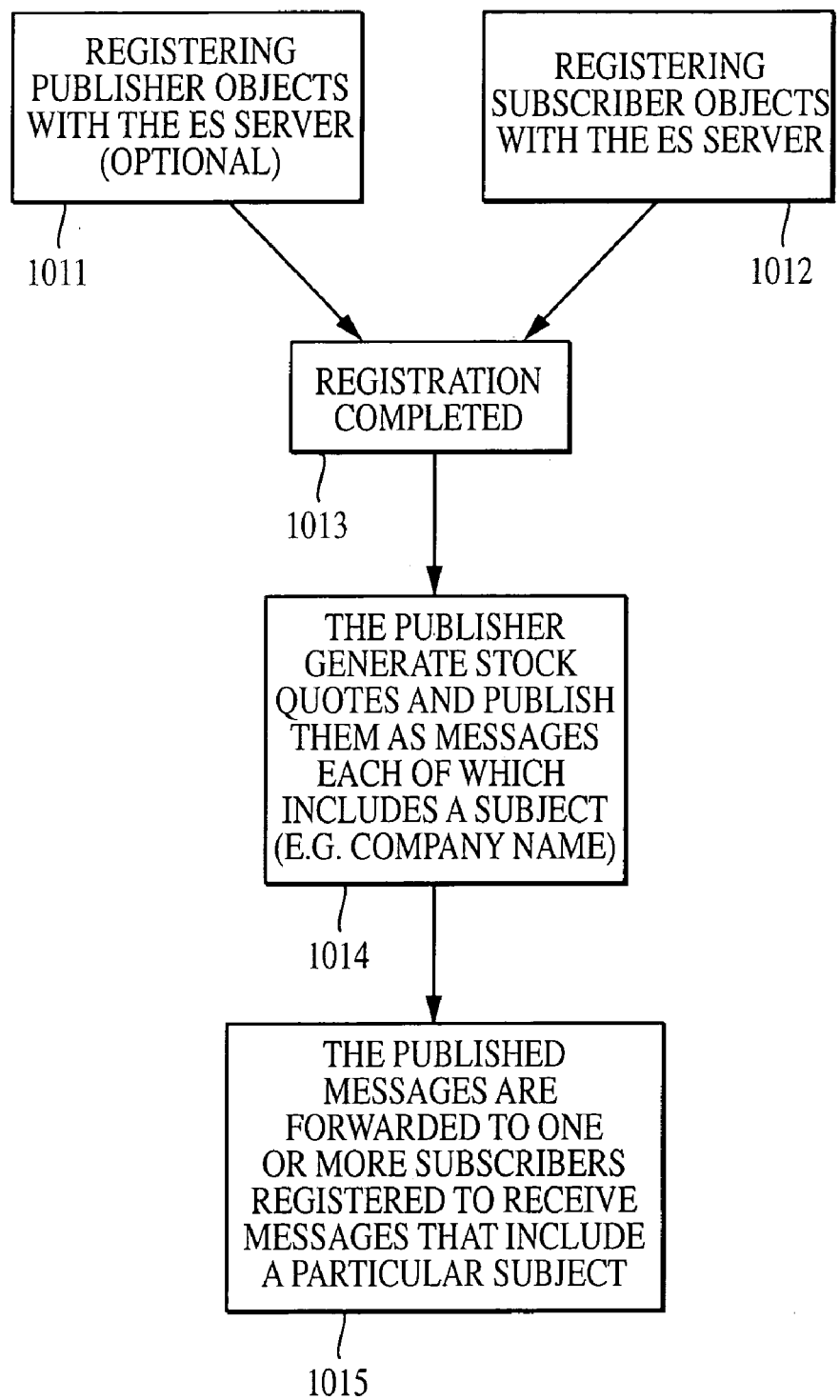
FIG. 10 is a flow chart representation of exemplary use of the message server of the present invention in the stock quote system depicted in FIG. 9.

The second exemplary illustration is now described with regard to FIGS. 9 and 10. Referring to FIGS. 9 and 10, there is shown a stock market price quote example 901 implemented using the features of the present invention. The quote example includes a stock quote publisher 902, a computer or a computer-like device, configured to monitor stock prices of companies listed in a stock market (e.g., DOW, NASDAQ, S&P 500, etc.). The stock quote system 901 further includes one or more ES servers 903 and a number of subscribers 904, 905, 906. The subscribers register with the one or more ES servers to receive stock quotes of various companies.

For instance, subscriber 1 registers to receive stock price quotes of companies named from AA to BB and subscriber 2 registers to receive stock price quotes of companies named from CC to DD.

Subsequently, the publisher creates messages containing stock quotes of the stock trading companies. Then, the messages are fired to the ES servers. Upon receiving the message, ES servers then forward the message to appropriate subscribers. For instance, if the message includes a stock quote of company AB, then it would be sent to Subscriber 1, and so on.

Figure 11:
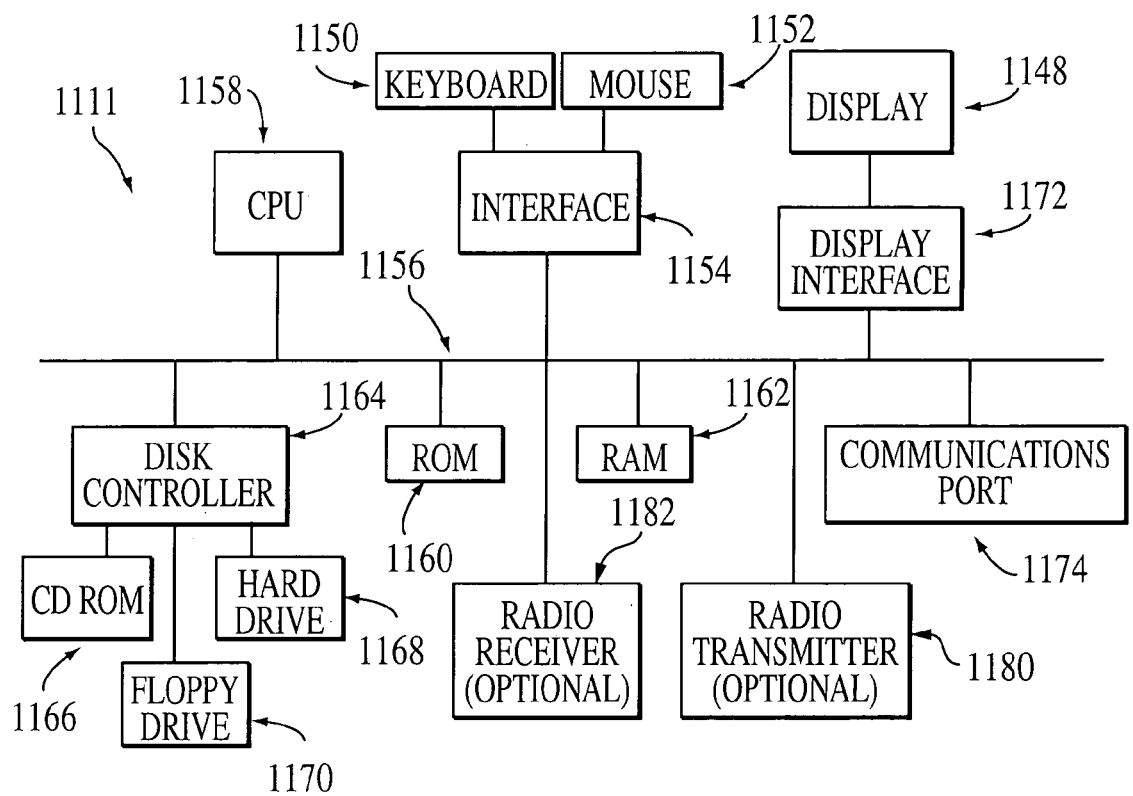
FIG. 11 is a block diagram representation of an exemplary embodiment of a computing system utilizable in aspects and environment of the present invention.

FIG. 11 illustrates a block diagram of one example of the internal hardware of a computer system 1111 that includes one or more of publishers, subscribers and ES server of FIG. 1. A bus 1156 serves as the main information highway interconnecting the other components of system 1111. CPU 1158 is the central processing unit of the system, performing calculations and logic operations required to execute the processes of the present invention as well as other programs. Read only memory (ROM) 1160 and random access memory (RAM) 1162 constitute the main memory of the system. Disk controller 1164 interfaces one or more disk drives to the system bus 1156. These disk drives are, for example, floppy disk drives 1170, or CD ROM or DVD (digital video disks) drives 1166, or internal or external hard drives 1168. These various disk drives and disk controllers are optional devices.

A display interface 1172 interfaces display 1148 and permits information from the bus 1156 to be displayed on display 1148. Display 1148 is also an optional accessory. For example, display 1148 could be substituted or omitted. Display 1148 may be used in displaying graphical user interface as shown in FIGS. 5 and 6. Communications with external devices such as the other components of the system described above, occur utilizing, for example, communication port 1174. Optical fibers and/or electrical cables and/or conductors and/or optical communication (e.g., infrared, and the like) and/or wireless communication (e.g., radio frequency (RF), and the like) can be used as the transport medium between the external devices and communication port 1174. Peripheral interface 1154 interfaces the keyboard 1150 and mouse 1152, permitting input data to be transmitted to bus 1156. In addition to these components, system 1111 also optionally includes an infrared transmitter and/or infrared receiver. Infrared transmitters are optionally utilized when the computer system is used in conjunction with one or more of the processing components/stations that transmits/receives data via infrared signal transmission. Instead of utilizing an infrared transmitter or infrared receiver, the computer system may also optionally use a low power radio transmitter 1180 and/or a low power radio receiver 1182. The low power radio transmitter transmits the signal for reception by components of the production process, and receives signals from the components via the low power radio receiver. The low power radio transmitter and/or receiver are standard devices in industry.

Although system 1111 in FIG. 11 is illustrated having a single processor, a single hard disk drive and a single local memory, the system 1111 is optionally suitably equipped with any multitude or combination of processors or storage devices. For example, system 1111 may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

Figure 12:
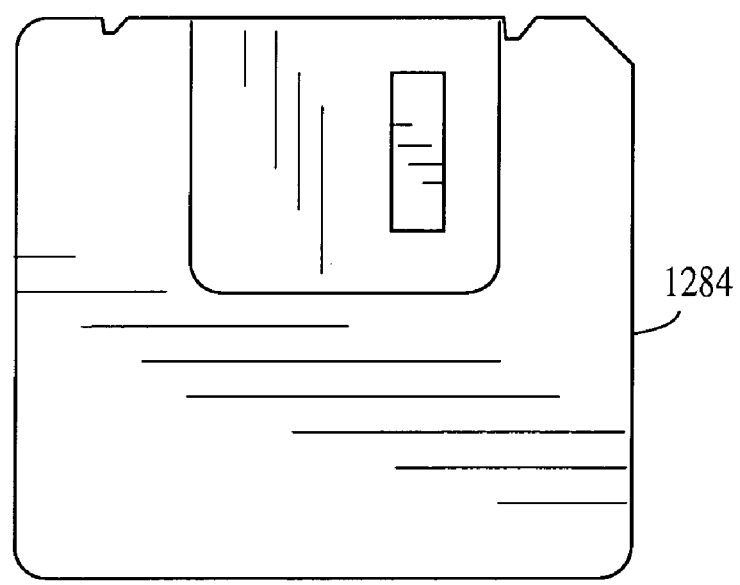
FIG. 12 illustrates one example of a memory medium which may be used for storing a computer implemented process of the present invention.

FIG. 12 is an illustration of an exemplary computer readable memory medium 1284 utilizable for storing computer readable code or instructions. As one example, medium 1284 may be used with disk drives illustrated in FIG. 11. Typically, memory media such as floppy disks, or a CD ROM, or a digital video disk will contain, for example, a multi-byte locale for a single byte language and the program information for controlling the above system to enable the computer to perform the functions described herein. Alternatively, ROM 1160 and/or RAM 1162 illustrated in FIG. 11 can also be used to store the program information that is used to instruct the central processing unit 1158 to perform the operations associated with the instant processes. Other examples of suitable computer readable media for storing information include magnetic, electronic, or optical (including holographic) storage, some combination thereof, etc.

In general, it should be emphasized that the various components of embodiments of the present invention can be implemented in hardware, software or a combination thereof. In such embodiments, the various components and steps would be implemented in hardware and/or software to perform the functions of embodiments of the present invention. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A message delivery system in a semiconductor assembly facility having a plurality of assembly line devices, comprising:
   (1) a publisher client configured to create a message having subject information and content information, configured to generate the subject information based on, in part, the content information when the message is being generated, and further configured to generate the subject information by appending a changeable portion to a fixed portion of the subject information, wherein the publisher client operates with one or more of the assembly line devices; and
   (2) a server configured to forward the message based on the subject information.

2. The system of claim 1 wherein one of the assembly line devices is an etcher configured to etch one or more layers of a substrate during manufacture of an electronic device in the assembly facility.

3. The system of claim 1 wherein one of the assembly line devices is a depositer configured to deposit one or more layers of a substrate during manufacture of an electronic device in the assembly facility.

4. The system of claim 1 wherein the server is further configured to operate within a controller computer configured to receive the messages generated by the publisher clients.

5. The system of claim 1 wherein the server is further configured to create a command based on the messages received from the publisher clients.

6. The system of claim 1 wherein the server is further configured to guarantee delivery of the message to a subscriber client registered to receive messages having the subject information.

7. The system of claim 1 wherein the publisher client is further configured to modify the changeable subject information's content when the message is created.

8. The system of claim 1 wherein the server is further configured to forward the message to one or more subscribers registered to receive messages having the subject information.

9. The system of claim 8 wherein the server is further configured to store information relating to one or more registered subscribers into a database.

10. The system of claim 9 wherein the server is further configured to store a copy of the database's content into a remote memory device.

11. The system of claim 1 further comprising a meta-data server configured to allow a user to view configuration information of a message that includes a plurality of subject elements.

12. The system of claim 11 wherein the meta-data server is further configured to provide at least one variable name and type to be a part of each of the plurality of subject elements.

13. The system of claim 11 wherein the meta-data server is further configured to allow the user to publish a portion of the message determined by the configuration information.

14. The system of claim 11 wherein the meta-data server is further configured to allow the user to include a part of the configuration information as a portion of the subject information.

* * * * *